(12) United States Patent
Aksyuk et al.

(10) Patent No.: US 7,928,631 B2
(45) Date of Patent: Apr. 19, 2011

(54) STABLE ELECTRO-MECHANICAL COMB DRIVE ACTUATORS

(75) Inventors: Vladimir Anatolyevich Aksyuk, Westfield, NJ (US); Carl Jeremy Nuzman, Union, NJ (US); Maria Elina Simon, New Providence, NJ (US); Alan Weiss, Millburn, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 715 days.

(21) Appl. No.: 11/394,950

(22) Filed: Mar. 31, 2006

(65) Prior Publication Data
US 2007/0228869 A1   Oct. 4, 2007

(51) Int. Cl.
*H02N 2/00* (2006.01)
*G02B 26/08* (2006.01)

(52) U.S. Cl. ............... 310/309; 359/224.1; 359/290
(58) Field of Classification Search .............. 310/309; 200/181; 359/223–226, 254, 290, 291
See application file for complete search history.

(56) References Cited

U.S. PATENT DOCUMENTS

| | | | | |
|---|---|---|---|---|
| 5,959,760 | A * | 9/1999 | Yamada et al. | 359/224 |
| 6,360,033 | B1 * | 3/2002 | Lee et al. | 385/18 |
| 6,384,510 | B1 * | 5/2002 | Grade et al. | 310/309 |
| 6,384,952 | B1 * | 5/2002 | Clark et al. | 359/224.1 |
| 6,497,141 | B1 * | 12/2002 | Turner et al. | 73/105 |
| 7,068,409 | B2 * | 6/2006 | Aksyuk et al. | 359/224 |
| 7,253,550 | B2 * | 8/2007 | Aksyuk et al. | 310/309 |
| 2001/0048784 | A1 | 12/2001 | Behin et al. | 385/18 |
| 2002/0005976 | A1 * | 1/2002 | Behin et al. | 359/254 |
| 2002/0020219 | A1 | 2/2002 | DeRoo et al. | 73/504.12 |
| 2002/0109894 | A1 | 8/2002 | Clark et al. | 359/224 |
| 2002/0130586 | A1 | 9/2002 | Mao et al. | 310/309 |
| 2002/0136485 | A1 | 9/2002 | Reed et al. | 385/18 |
| 2003/0161574 | A1 | 8/2003 | Aksyuk et al. | 385/16 |
| 2004/0156580 | A1 | 8/2004 | Baumann et al. | 385/16 |
| 2004/0179773 | A1 | 9/2004 | Aksyuk et al. | 385/18 |
| 2005/0052723 | A1 | 3/2005 | Watanabe et al. | 359/290 |
| 2005/0062361 | A1 | 3/2005 | Harley et al. | 310/309 |
| 2005/0136621 | A1 | 6/2005 | Ridley et al. | 438/459 |
| 2007/0228869 | A1 * | 10/2007 | Aksyuk et al. | 310/309 |

OTHER PUBLICATIONS

Bronson et al. "Modeling and Alleviating Instability in a MEMS Vertical Comb Drive Using a Progressive Linkage", Sep. 24, 2005, Proceedings of IDETC/CIE 2005 ASME 2005 International Design Engineering Technical Conference and Computer and Information in Engineering Conference.*

(Continued)

*Primary Examiner* — Karl I Tamai
(74) *Attorney, Agent, or Firm* — John F. McCabe

(57) ABSTRACT

An electro-mechanical actuator includes a comb drive and a deformable connector. The comb drive has a first capacitor plate and a second capacitor plate. The capacitor plates have teeth capable of inter-digitating. The deformable connector is configured to apply a mechanical restoring force to the first capacitor plate. The deformable connector is configured to restore the first capacitor plate to be at an equilibrium rest position in response to no control voltage being applied across the capacitor. The comb drive is more engaged at the equilibrium rest position than at a mechanical stability threshold of the comb drive. The capacitor plates are disengaged at the equilibrium rest position.

6 Claims, 14 Drawing Sheets

OTHER PUBLICATIONS

"CCIT Phase II Mirror Modeling and Training" by Alan Weiss (13 pages) presented on Mar. 15, 2005 at a Quarterly Report Meeting for the CCIT project, which was funded by the US Government. At the presentation, the attendees were: parties of the CCIT project who were subject to a Non-Disclosure Agreement and evaluators/administrators of the U.S. Government for the CCIT Project.

"CCIT MEMS Macromodel" by Carl Nuzman (6 sheets) presented on Dec. 15, 2004 (6 sheets) at a Quarterly Report Meeting for the CCIT project, which was funded by the US Government. At the presentation, the attendees were: parties of the CCIT project who were subject to a Non-Disclosure Agreement and evaluators/administrators of the U.S. Government for the CCIT Project.

Tang, W.C. et al., "Electrostatic-comb Drive of Lateral Polysilicon Resonators," Sensors and Actuators, A21-A23, pp. 328-331, 1990.

* cited by examiner

STABLE ELECTRO-MECHANICAL COMB DRIVE ACTUATORS

The U.S. Government has a paid-up license in this invention and the right in limited circumstances to require the patent owner to license others on reasonable terms as provided for by the terms of contract No. HR0011-04-C-0048 awarded by DARPA under CCIT.

BACKGROUND

1. Technical Field

The invention relates to electro-mechanical actuators, methods of calibrating electro-mechanical actuators, and method of operating electro-mechanical actuators.

2. Discussion of Related Art

This section introduces aspects that may facilitate a better understanding of the invention. Accordingly, the statements of this section are to be read in that light. The statements of this section are not admissions about what is in the prior art or about what is not in the prior art.

Many electro-mechanical actuators incorporate a comb drive. Herein, a comb drive refers to a capacitor having two capacitor plates, wherein each capacitor plate has teeth capable of inter-digitating with teeth of the other capacitor plate and, at least, one capacitor plate can move relative to the other capacitor plate. The teeth of the capacitor plates of a comb drive will increase the surface area of the capacitor thereby increasing the associated capacitance. Due to the increased surface area, a comb drive often will be able to produce a larger electrostatic force between its two capacitor plates than a planar capacitor having comparable overall dimensions but lacking capacitor plates with teeth.

In an electro-mechanical actuator that is based on comb drives, the mobile capacitor plates of the comb drives may be physically fixed to a structure so that the movement of the mobile capacitor plates displaces and/or reorients the structure. Then, the control voltages applied to the comb drives can be used to both displace the mobile capacitor plates of the comb drives and displace and/or reorient the structure physically fixed to those mobile capacitor plates.

SUMMARY

Certain aspects commensurate in scope with some embodiments are set forth below. It should be understood that these aspects are presented merely as illustrative and that these aspects are not intended to limit the scope of the invention.

Various embodiments provide electro-mechanical actuators that are based on comb drives. Some such electro-mechanical actuators provide a limited mechanical operation range over which the teeth of each comb drive therein are inter-digitated. For that reason, it may be advantageous to have electro-mechanical actuators configured to enable the teeth of one or more comb drive to disengage. Some embodiments of the electro-mechanical actuators are configured so that teeth of one or more comb drive therein can disengage over a portion of the actuator's mechanical operation range. Some such mechanical actuators may provide increased ranges for produced displacements and/or orientations due to the absence of a requirement that the teeth of each comb drive be engaged over the entire range of mechanical operation of the actuators.

In another aspect, an apparatus includes an electro-mechanical actuator. The electro-mechanical actuator includes a comb drive and a deformable connector. The comb drive has a first capacitor plate and a second capacitor plate. The capacitor plates have teeth capable of inter-digitating. The deformable connector is configured to apply a mechanical restoring force to the first capacitor plate. The deformable connector is configured to restore the first capacitor plate to be at an equilibrium rest position in response to no control voltage being applied across the capacitor. The comb drive is more engaged at the equilibrium rest position than at a mechanical stability threshold of the comb drive. The capacitor plates are disengaged at the equilibrium rest position.

In some embodiments, the equilibrium rest position is such that the first capacitor plate has a unique equilibrium position for each control voltage applied across the comb drive.

In some embodiments, the electro-mechanical actuator further includes a second comb drive, a second deformable connector, and a voltage source. The second comb drive has a third capacitor plate and a fourth capacitor plate. The third and fourth capacitor plates have teeth capable of inter-digitating. The second deformable connector is configured to apply a restoring force to the third capacitor plate. The voltage source is connected to apply voltages across the comb drives such that both comb drives can become disengaged and such that each comb drive is more engaged at its equilibrium rest position than at its mechanical stability threshold. The voltage source may be configured to apply one nonzero voltage across the comb drive to cause the first capacitor plate to move to an equilibrium position and be disengaged from the second capacitor plate. The voltage source may also be configured to apply voltages to the comb drives such that each comb drive is more engaged at its effective equilibrium rest position than at its mechanical stability threshold.

In one aspect, an electro-mechanical actuator includes a comb drive, a deformable connector, and a voltage source. The comb drive has a first capacitor plate and a second capacitor plate. The capacitor plates have teeth capable of inter-digitating. The deformable connector is configured to apply a restoring force to the first capacitor plate. The voltage source is connected to apply a plurality of control voltages across the capacitor plates and is configured to cause the first capacitor plate to move to at least one equilibrium position where the first and second capacitor plates are disengaged.

The voltage source may be configured to apply another control voltage across the comb drive to cause the first capacitor plate to be in an equilibrium position and be engaged with the second capacitor plate. The other voltage may cause the comb drive to be strongly engaged.

The voltage source may be configured to apply one voltage to the comb drive. The first capacitor plate has two different equilibrium positions when the one voltage is applied to the comb drive.

The voltage source is configured to cause the first capacitor plate to move from equilibrium positions in a first stability region to equilibrium positions in a second stability region by applying a special voltage to the comb drive to cause the first capacitor plate to move through an unstable region. The first capacitor plate has a unique equilibrium position when the special voltage is applied to the comb drive.

The electro-mechanical actuator further includes a second comb drive and a second deformable connector. The second comb drive has a third capacitor plate and a fourth capacitor plate. The third and fourth capacitor plates have teeth capable of inter-digitating. The first and third capacitor plates are mechanically connected. The second deformable connector is configured to apply a restoring force to the third capacitor plate. The voltage source is configured to apply control voltages across the second comb drive.

The voltage source may be configured to apply control voltages that cause the first capacitor plate to be engaged in the comb drive containing the first capacitor plate when third capacitor plats is disengaged in the comb drive containing the third capacitor plate.

In another aspect, an method for operating an electro-mechanical actuator having a plurality of comb drives includes applying a sequence of control voltages to the comb drives of the plurality to cause the actuator to pass through a corresponding sequence of different states. One of the comb drives is disengaged in one of the states.

The one of the comb drives may be more engaged in the one of the states than at its mechanical stability threshold.

A plurality of the states are such that one of the comb drives is disengaged. The applying step is such that each comb drive remains more engaged in the states than at its own mechanical stability threshold.

The applying step is such that some of the comb drives becomes disengaged in one or more of the states. The applying step is such that each comb drive is more engaged in the states than at its effective equilibrium rest positions during the applying steps.

BRIEF DESCRIPTION OF THE DRAWINGS

Various embodiments are described more fully by the Figures and Detailed Description of Illustrative Embodiments. Nevertheless, the inventions may be embodied in various forms and are not limited to embodiments described in the Figures and/or Detailed Description of Illustrative Embodiments.

In the Figures and text, like reference numerals indicate elements with similar functions.

In the Figures, the relative sizes of some elements or portions thereof may be increased or decreased to better illustrate features of the embodiments being represented.

DETAILED DESCRIPTION OF ILLUSTRATIVE EMBODIMENTS

The various embodiments include electro-mechanical actuators that have one or more comb drives. Some structures for electro-mechanical actuators and comb drives and/or methods of fabricating such structures may be described in U.S. patent application Ser. No. 10/813,951 filed on Mar. 31, 2004 by Vladimir A. Aksyuk et al and in U.S. patent application Ser. No. 11/140,313 filed on May 27, 2005 by Vladimir A. Aksyuk. These patent applications are incorporated herein by reference in their entirety.

Herein, some embodiments of the electro-mechanical actuators are, e.g., micro-electro-mechanical systems (MEMS). MEMS are electro-mechanical devices that have some functional features with dimensions of less than about 10 micrometers. Some of the electro-mechanical actuators 10, 10', 10", 10''' of FIGS. 1A, 1B, 7, and/or 8A-8B may have comb drives with teeth 26 whose widths are less than about 4 micrometers or even less than about 0.5 micrometers. Similarly, some of the electro-mechanical actuators 10, 10', 10", 10''' FIGS. 1A, 1B, 7, and 8A-8B may have comb drives in which gaps between adjacent teeth 26 are less than about 4 micrometers or even less than about 0.5 micrometers. Similarly, some of the electro-mechanical actuators 10, 10', 10", 10''' of FIGS. 1A, 1B, 7, and 8A-8B may have deformable connectors 20, e.g., bars 20", 20', whose widths and/or thicknesses are less than about 4 micrometers or less than about 0.5 micrometers.

Figure 1A:
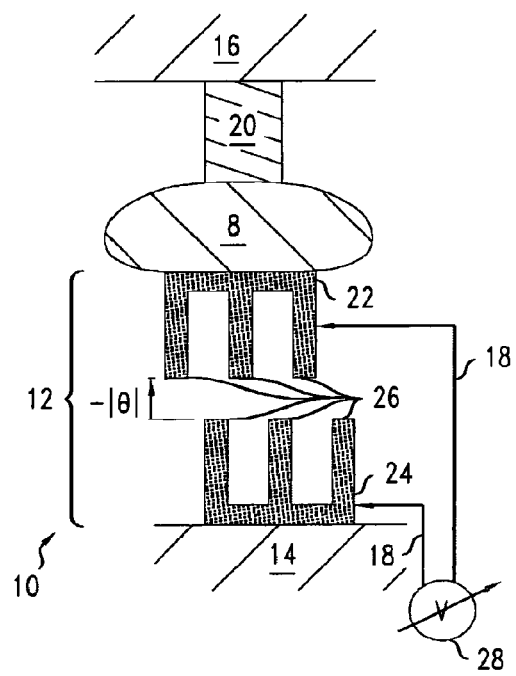
FIGS. 1A and 1B are side-views illustrating respective disengaged and engaged states of an electro-mechanical actuator having one comb drive, e.g., a MEMS actuator.
Figure 1B:
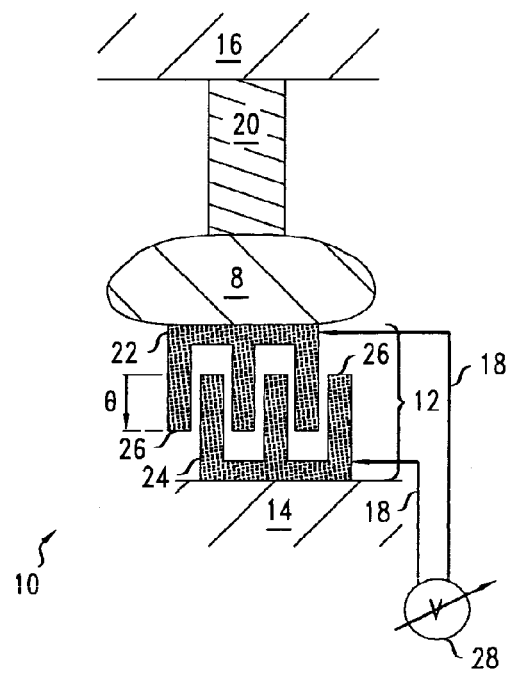

FIGS. 1A-1B schematically illustrates two mechanical operational states of one embodiment of an electro-mechanical actuator 10, e.g., a MEMS actuator. The electro-mechanical actuator 10 is able to move the structure 8 to various positions in a preselected range and is able to mechanically maintain the structure 8 at said positions. The structure 16 may be a support for an object (not shown), wherein the object has a function outside of the operation of the electro-mechanical actuator 10, e.g., the object may an optical mirror, an optical grating, or an acoustical element.

The electro-mechanical actuator 10 includes a single comb drive 12, first and second physical supports 14, 16, and a deformable connector 20.

The comb drive 12 has a mobile capacitor plate 22 and an immobile capacitor plate 24. The mobile capacitor plate is rigidly fixed to the structure 8. The immobile capacitor plate 24 is rigidly fixed to the first physical support 14. Each capacitor plate 22, 24 has a series of conductive and parallel oriented teeth 26. The teeth 26 of each capacitor plate 22, 24 are configured to be able inter-digitate with the teeth 26 of the other capacitor plate 24, 22. The capacitor plates 22, 24 may be made of a variety of conductors, e.g., heavily doped semiconductor or metal.

In some embodiments, the comb drive 12 may be replaced by a comb drive (not shown) in which both capacitor plates are able to move with respect to the physical support for the comb drive.

Referring again to FIGS. 1A-1B, the first and second physical supports 14, 16 have rigid relative placements and thus, function as immovable structures to which the other components of the electro-mechanical actuator 10 attach. The first and second physical supports 14, 16 may be, e.g., separate portions of a single monolithic structure (not shown). For example, the first and second physical supports 14, 16 may be portions Of a single semiconductor and/or dielectric substrate.

The deformable connector 20 provides the physical connector between the second physical support 16 and the combination formed by the mobile capacitor plate 22 and the structure 8. The deformable connector 20 also provides a mechanical force that tends to restore the combination of the mobile capacitor plate 22 and the structure 8 to a preset equilibrium rest position. The mechanical restoring force is approximately linear in the deformation of the deformable connector 20 over a range of deformations. Exemplary deformable connectors 20 include a Hookian spring, torsion bar, flexible bar, elastic filament or combination of one or more such structures.

The electro-mechanical actuator 10 includes a variable voltage source 28 and electrical connections 18 that connect the variable voltage source 28 between the capacitor plates 22, 24 of the comb drive 12. The voltage source 28 may be a smart source that is capable of applying control voltages, Vs, of various magnitude across the capacitor plates 22, 24, and is capable of both maintaining the magnitude of the applied control voltages, Vs, and/or slowly sweeping the magnitude of the applied control voltages, Vs. The electrical connections 18 are configured to not cause any substantial mechanical impediment to the movements of the mobile capacitor plate 22 and the attached structure 8.

The mobile capacitor plate 22 has a position that is defined by a coordinate, $\Theta$. The coordinate $\Theta$ measures the distance between distal portions of the teeth 26 of the two capacitor plates 22, 24 along the linear path of movement of the mobile capacitor plate 22. The coordinate, $\Theta$, is positive when the teeth 26 of the capacitor plates 22, 24 are inter-digitated, i.e., when the plates 22, 24 of the comb drive 12 are engaged, and is negative when the teeth 26 of the two capacitor plates are not inter-digitated, i.e., when the plates 22, 24 of the comb drive 12 are disengaged. That is, $\Theta=0$ is the position at which the teeth 26 of the capacitor plates 22, 24 are at the boundary of being inter-digitated.

During operation, the mobile capacitor plate 22 and structure 8 may be subjected to an electrical driving force, $F_E$, a mechanical force, $F_M$, a dissipation force, $F_D$, and possibly a constant force such as gravity. In this description, a constant force like gravity may be ignored, but one of skill in the art would know how to account for such forces in light of the description herein. The forces $F_E$, $F_M$, and $F_D$ control the motion of the mobile capacitor plate 22 and the structure 8.

The electrical driving force, $F_E$, results from the control voltage, V, applied across the capacitor plates 22, 24 of the comb drive 12. The electrical driving force $F_E$ is minus the derivative with respect to $\Theta$ of the electrostatic energy stored in the comb drive 12. The stored electrostatic energy is $-\frac{1}{2}(V^2 C(\Theta))$ where $C(\Theta)$ is the capacitance of the comb drive 12 when the mobile capacitor plate is at the position $\Theta$. Thus, the electrical driving force $F_E$ along the axis of motion of the mobile capacitor plate 22 is $W \cdot f(\Theta)$ where $W=\frac{1}{2}(V^2)$ and $f(\Theta)=\partial_\Theta C(\Theta)$. Thus, the function $f(\Theta)$ determines how the electrical driving force $F_E$ varies with the position of the mobile capacitor plate 22, i.e., up to a scale.

Herein, $f(\Theta)$ is referred to as the capacitance slope function, because the function $f(\Theta)$ is the derivative of the capacitance of the comb drive 12 with respect to the position coordinate of the mobile capacitor plate 22 thereof. The qualitative form of the capacitance slope function, $f(\Theta)$, can be determined from the behavior of the capacitance of the comb drive 12 at large values of the position coordinate $\Theta$. For large negative values of $\Theta$, the capacitor plates 22, 24 are often significantly disengaged so that the capacitance, $C(\Theta)$, and the capacitance slope function, $f(\Theta)$, both tend towards zero. For that reason, the capacitance slope function, $f(\Theta)$, is often small for large negative values of $\Theta$. For large positive values of $\Theta$, the capacitance of the comb drive 12 is often approximately proportional to the engaged capacitor plate area. For that reason, the capacitance, $C(\Theta)$, often becomes approximately linearly in $\Theta$ for large positive values of $\Theta$. Thus, the capacitance slope function, $f(\Theta)$, often approaches a constant limiting value for large positive values of $\Theta$. The capacitance slope, $f(\Theta)$, is also a positive function.

Figure 2:
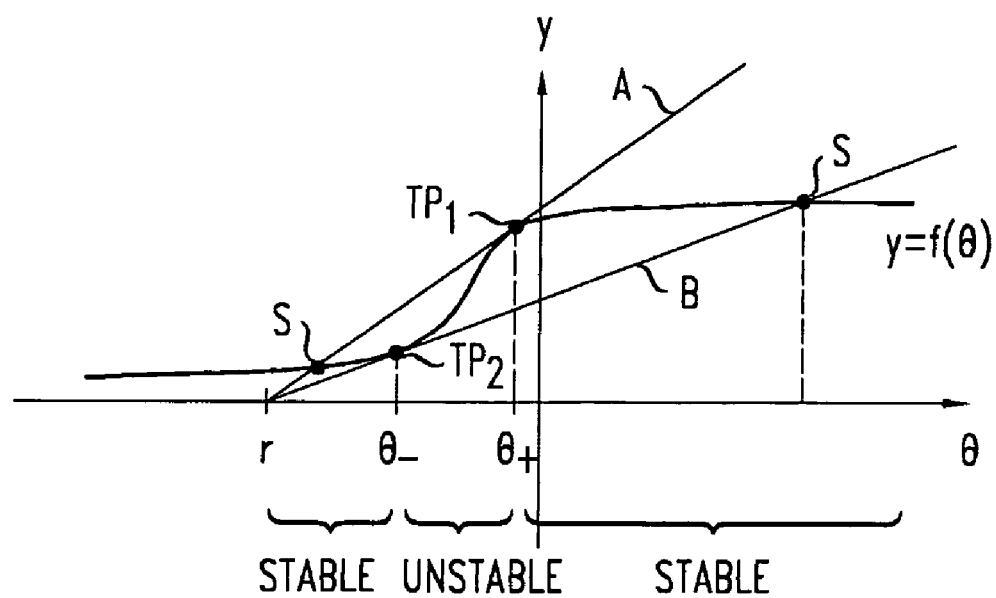
FIG. 2 illustrates how electrostatic and mechanical forces vary with the relative position of the two capacitor plates of a comb drive in one embodiment of the electro-mechanical actuator of FIGS. 1A and 1B.

FIG. 2 schematically plots the capacitance slope function, $f(\Theta)$, as a function of the position coordinate, $\Theta$, for the mobile capacitor plate 22. As already described, the capacitance slope function, $f(\Theta)$, is a positive function that often approaches constant limit values for large positive values of $\Theta$ and large negative values of $\Theta$. For small values of the magnitude of the coordinate $\Theta$, the capacitance slope function, $f(\Theta)$, may smoothly vary between the two limit values.

The mechanical force, $F_M$, is the restoring forced produced by deformations of the deformable connector 20. Near the position where $\Theta=0$, the mechanical force, $F_M$, is often approximately a linear function of the position coordinate, $\Theta$, of the mobile capacitor plate. In particular, the mechanical force $F_M$ typically has a magnitude that is approximately given by $|k(\Theta-r)|$ where "k" will be referred to as the mechanical spring constant, and "r" will be referred to as the equilibrium rest position of the mobile capacitor plate 22. Herein, the equilibrium rest position for a mobile capacitor plate of a comb drive refers to the capacitor plate's equilibrium position when no control voltage is applied to the comb drive. The equilibrium rest position is determined by the mechanical force, e.g., $F_M$, that is applied to the mobile capacitor plate. The mechanical spring constant, k, is a constant that characterizes the strength of the restoring force produced by the deformable connector 20, i.e., an approximately Hookian force. The equilibrium rest position, r, defines the equilibrium position of a mobile capacitor plate in the absence of electrostatic forces in the associated capacitor. For example, in the comb drive 12, the mechanical force, $F_M$, and possibly gravity are the only forces applied to the mobile capacitor plate 22 at its equilibrium rest position. The equilibrium rest position is the position that the mobile capacitor plate 22 will eventually take when the control voltage, V, across the capacitor plates 22, 24 vanishes.

The dissipation force, $F_D$, results from one or more damping mechanisms, e.g., air resistance and heating losses in the deformable connector 20. The dissipative force, $F_D$, will vanish when the mobile capacitor plate 22 ceases to move.

Based on the forms-of the forces $F_E$, $F_M$, and $F_D$, Newtonian mechanics will predict the following motion equation for the mobile capacitor plate 22:

$$m\ddot{\Theta} = W \cdot f(\Theta) - k(\Theta - r) + F_D(\dot{\Theta}). \quad (1)$$

In motion equation (1), m is the effective mass of the combination formed by the mobile capacitor plate 22 and the structure 8, and $\ddot{\Theta}$ is the acceleration of the same combination. The motion equation (1) also determines the location of any equilibrium positions of the mobile capacitor plate 22. At an equilibrium position, the mobile capacitor plate's velocity, $\dot{\Theta}$, and the mobile capacitor plate's acceleration, $\ddot{\Theta}$, will eventually vanish provided that the control voltage across the comb drive 12 is held constant. For that reason, $F_D=0$ at any equilibrium position. Then, motion equation (1) implies that an equilibrium position of the mobile capacitor plate 22 will satisfy:

$$W \cdot f(\overline{\Theta}) = k(\overline{\Theta} - r) \quad (2)$$

where $\overline{\Theta}$ is the value of the position coordinate of the mobile capacitor plate 22 at the equilibrium position. From the equilibrium equation (2), the magnitude of the control voltage, V, which is applied to the comb drive 12, is uniquely fixed by the equilibrium position of its mobile capacitor plate. In particular, the equilibrium control voltage, V, is given by:

$$|V| = \sqrt{[2k(\overline{\Theta} - r)/f(\overline{\Theta})]}. \quad (3)$$

There is usually an engaged equilibrium position when the position coordinate, $\Theta$, is both greater than r and positive. Such an equilibrium position is present, because the ratio $k(\Theta-r)/f(\Theta)$ is positive for such values of the position coordinate, $\Theta$. There may be one or more other equilibrium positions for same value of the control voltage, V, due to the fact that $f(\Theta)$ varies with $\Theta$. The presence of more than one equilibrium position for a given value of the control voltage, V, may be undesirable, because such a situation implies that the equilibrium location of the mobile capacitor plate 22 will not be fixed uniquely by the value of the control voltage, V, itself. Instead, the equilibrium position will depend on the history of the motion of the mobile capacitor plate 22, i.e., there will be hysteresis.

An equilibrium position may be a stable or unstable configuration. Near a stable equilibrium position, a small change in the control voltage will not produce a large displacement of the mobile capacitor plate 22. Near an unstable equilibrium position, a small change in the control voltage can cause a large displacement of the mobile capacitor plate 22. For these reasons, unstable equilibrium positions are undesirable as operating configurations for the electro-mechanical actuator 10.

Near an equilibrium position, $\overline{\Theta}$, the displacement, x, of the mobile capacitor plate from the equilibrium position, i.e., $x = \Theta - \overline{\Theta}$, is approximately described by a fluctuation equation of the form:

$$m\ddot{x} = [\overline{W} \cdot \partial_\Theta f(\overline{\Theta}) - k]x + F_D(\dot{x}). \quad (4)$$

Here, $\overline{W}$ is the value of $V^2/2$ that satisfies equilibrium equation (2), i.e., $\overline{W} = k(\overline{\Theta} - r)/f(\overline{\Theta})$. Fluctuation equation (4) typically implies that an equilibrium position will be stable to small displacements of the mobile capacitor plate 22 if $[\overline{W} \cdot \partial_\Theta f(\overline{\Theta}) - k] < 0$ and will be unstable to such small displacements if $[\overline{W} \cdot \partial_\Theta f(\overline{\Theta}) - k] < 0$.

Since a small variation of the control voltage may cause a large displacement of the mobile capacitor plate 22 at an unstable equilibrium position, it is typically not possible to maintain the mobile capacitor plate 22 at an unstable equilibrium position. Unfortunately, unstable equilibrium positions are often common for a range of values of the control voltage, V. Indeed, the presence of such unstable equilibrium positions are often indicative of more than one operating region where there is a stable equilibrium position for the mobile capacitor plate 22.

Figure 3:
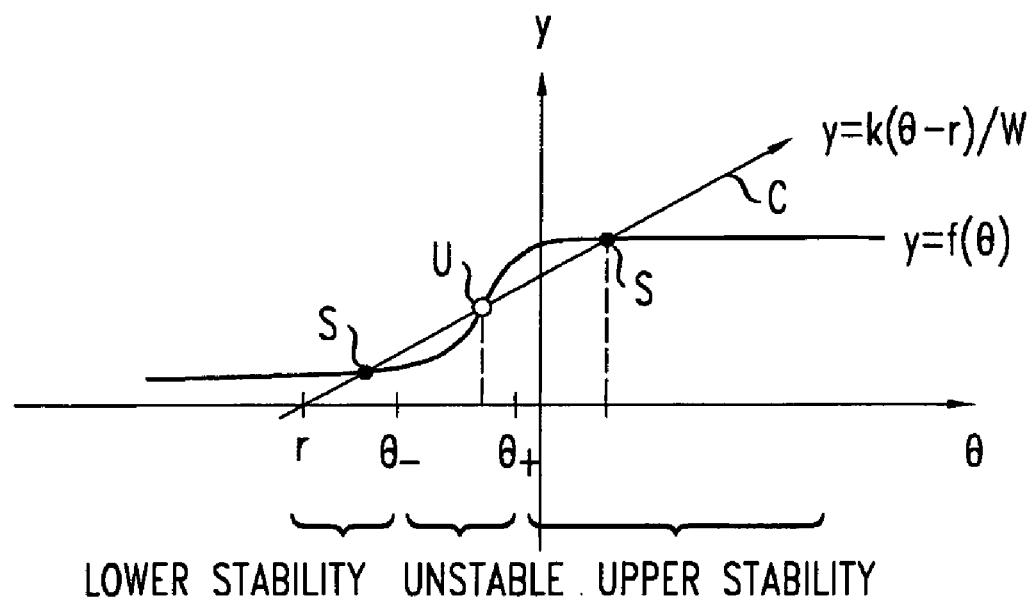
FIG. 3 illustrates how electrostatic and mechanical forces vary with the relative position of the two capacitor plates of a comb drive for another applied control voltage in the same embodiment of the electro-mechanical actuator, e.g., a MEMS actuator.

FIGS. 2-3 schematically graph forms that $f(\Theta)$ and $k(\Theta - r)/W$ might have for the mobile capacitor plate 22 of an exemplary embodiment of the electro-mechanical actuator 10. In particular, the thick lines illustrate the capacitance slope function, $f(\Theta)$, of the comb drive 12 in the exemplary embodiment of the electro-mechanical actuator 10, and the thin lines A-C schematically illustrate $k(\Theta-r)/W$ for various values of the control voltage that might be applied to the comb drive. The control voltage, V, would have a larger magnitude on the line B than on the line C and would have a larger magnitude on the line C than on the line A. For that reason, the slopes of the lines decrease from A to C and from C to B.

FIGS. 2 and 3 also provide graphical evaluations of the equilibrium positions of the mobile capacitor plate 22 for the graphed values of the control voltage, V. In particular, an equilibrium position corresponds to an intersection between one line A, B, C for $k(\Theta-r)/W$ and the line for the capacitance slope function, $f(\Theta)$. Furthermore, at an intersection, the relative slopes of $f(\Theta)$ and $k(\Theta-r)/W$ determine whether the equilibrium position will be stable or unstable. The intersection corresponds to a stable equilibrium position when the slope of $f(\Theta)$ is less than the slope of $k(\Theta-r)/W$ and corresponds to an unstable equilibrium position when the slope of $f(\Theta)$ is greater than the slope of $k(\Theta-r)/W$. Based on the above remarks, the control voltages corresponding to the lines A and B both produce one stable equilibrium position, S, and the control voltage corresponding to the line C produces two stable equilibrium positions, S, and one unstable equilibrium position, U.

Referring to FIGS. 2-3, equilibrium characteristics of an electro-mechanical actuator 10 can change qualitatively with the control voltage that is applied to the comb drive 12. For small control voltages, V, there is typically a unique stable equilibrium position, because the slope of $k(\Theta-r)/W$ is high. As the control voltage, V, increases, the graph of $k(\Theta-r)/W$ may become tangent to $f(\Theta)$, e.g., as at point $TP_1$ of the line A. Then, further increases of the control voltage, V, will produce the qualitative situation of FIG. 3. In particular, the further increase of the control voltage has split the tangent point $TP_1$ into one unstable equilibrium position, U, and one stable equilibrium position, S. As the control voltage, V, continues to increase, the graph of $k(\Theta-r)/W$ may again become tangent to $f(\Theta)$, e.g., as at point $TP_2$ of the line B. Further increases of the control voltage, V, produce a situation where a unique equilibrium position exists for each control voltage, V.

For each control voltage between that of the line A and that of the line B, the electro-mechanical actuator 10 has two stable equilibrium positions, S, and one unstable equilibrium position, U, as shown in FIG. 3. For this range of control voltages, the space of equilibrium positions of the mobile capacitor plate 22 separates into an upper stability region, a lower stability region, and an unstable region located between the upper and lower stability regions. In much of the upper stability region, the teeth 26 of the comb drive 12 may be engaged, i.e., inter-digitated. The tangent point $TP_1$ defines the lower boundary, $\Theta_+$, of the upper stable region. In the lower stability region, the teeth 26 of the comb drive 12 are often disengaged, i.e., not inter-digitated. The tangent point $TP_2$ defines the upper boundary, $\Theta_-$, of the lower stable region.

The presence of an unstable region is indicative of configurations with more than one stable equilibrium position. Due to the presence of more than one stable equilibrium, the motion of the mobile capacitor plate 22 shows hysteresis when the control voltage, V, has a value between that of the line A and that of the line B. Hysteresis occurs, because the actual equilibrium position of the mobile capacitor plate 22 will depend on the history of the motion of the mobile capacitor plate 22. In some embodiments, the electro-mechanical actuator 10 is operated in a manner that uniquely fixes the equilibrium position of the mobile capacitor plate 22 at any time even in the presence of such hysteresis.

In many situations such hysteresis is undesirable in an electro-mechanical actuator. For that reason, some embodiments of the electro-mechanical actuator 10 of FIGS. 1A-1B are configured to produce only one equilibrium position of the mobile capacitor plate 22 for all values of the control voltage. Those embodiments of the electro-mechanical actuator 10 are configured so that the equilibrium rest position, r, of the mobile capacitor plate 22 is greater than a mechanical stability threshold, $\bar{r}$, of the comb drive 12.

To understand the origin of the mechanical stability threshold, $\bar{r}$, it may be useful to notice that the upper stability region of FIGS. 2-3 grows as the equilibrium rest position, r, of the mobile capacitor plate is increased from large negative values. Indeed, when the equilibrium rest position, r, becomes greater than the mechanical stability threshold, $\bar{r}$, i.e., when r > $\bar{r}$, any control voltage that is applied to the comb drive will produce only one stable position for the mobile capacitor plate. This condition on the equilibrium rest position of the mobile capacitor plate, i.e., r > $\bar{r}$, can also typically be restated in another manner. In particular, the stability condition is typically equivalent to a requirement that the comb drive be more engaged when its mobile capacitor plate is at its equilibrium rest position, r, than when its mobile capacitor plate is at the mechanical stability threshold, $\bar{r}$, of the comb drive. See, e.g., FIG. 4. Under the same condition, the mobile capacitor plate will not have an unstable equilibrium position for any value of the control voltage applied to the comb drive.

Also, the value of the mechanical stability threshold, $\bar{r}$, typically only depends on the form of the capacitance slope function, $f(\Theta)$. In particular, the mechanical stability threshold, $\bar{r}$, is the right-most $\Theta$-intercept for a set if tangent lines to the capacitance slope function, $f(\Theta)$. In finding the right most $\Theta$-intercept, one only considers the set of tangent lines that are tangent to the capacitance slope function, $f(\Theta)$, at $\Theta$-values where the slope of the capacitance slope function is positive. For a tangent line at $\Theta=B$, the tangent line's $\Theta$-intercept is equal to $B-f(B)/\partial_\Theta f(\Theta)|_{\Theta=B}$. Thus, mechanical stability threshold, $\bar{r}$, is the maximum of $\{\Theta-f(\Theta)/\partial_\Theta f(\Theta)\}$ over the values of the position coordinate, $\Theta$, at which $\partial_\Theta f(\Theta) > 0$.

Figure 4:
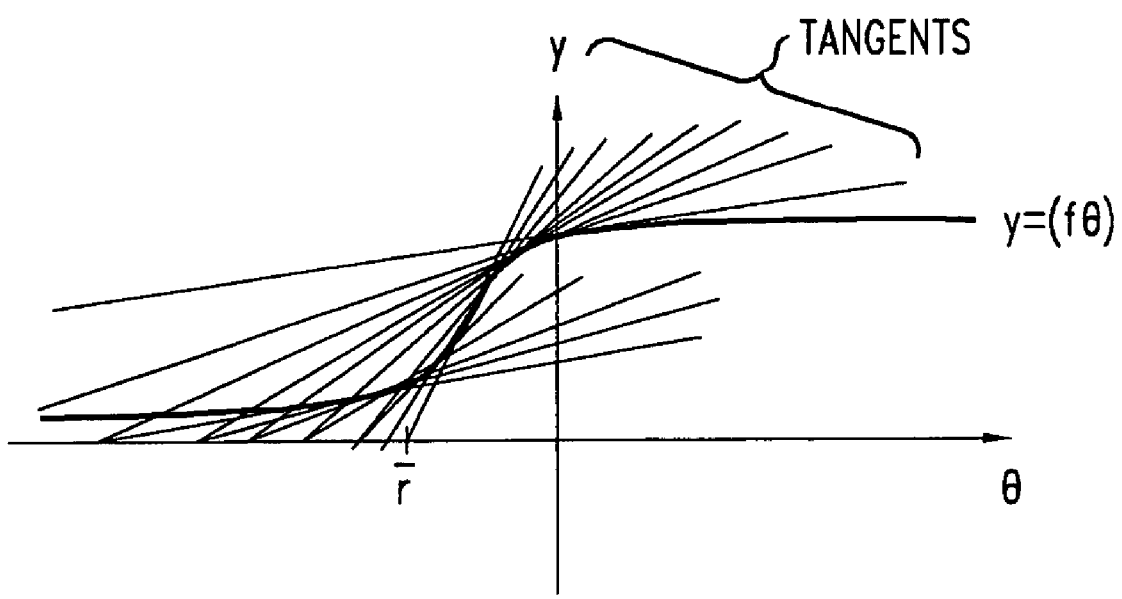
FIG. 4 illustrates a graphical evaluation of the mechanical stability threshold for one embodiment of the comb drive in the electro-mechanical actuator of FIGS. 1A and 1B.

The mechanical stability threshold, $\bar{r}$, may be estimated graphically as illustrated in FIG. 4. There, the straight lines represent tangent lines to various points on the capacitance slope function, $f(\Theta)$. The mechanical stability threshold, $\bar{r}$, is the right boundary to the region where the tangent lines intercept the $\Theta$-axis. The graphical construction clarifies why unstable equilibrium positions are absent when the deformable connector 20 of FIG. 1 is configured to cause the equilibrium rest position, r, of the mobile capacitor plate 22 to be to the right of the mechanical stability threshold, $\bar{r}$. In such a configuration, no line through the equilibrium rest position, r, can intersect the capacitance slope function, $f(\Theta)$, more than once. Thus, unstable equilibrium positions are absent in such configurations of the electro-mechanical actuator 10.

In some electro-mechanical actuators, an effective equilibrium rest position of the mobile capacitor plate of a first comb drive can be varied by pulling against the mobile capacitor plate of the first comb drive with one or more other comb drives therein. Then, it may turn out that the truth or falseness of the above stability condition, i.e., r > $\bar{r}$, will depend on control voltages applied to the other comb drives. Indeed, the value of the effective equilibrium rest position, which can get such a pulling against contribution from other comb drives, should typically determine whether the mobile capacitor plate of the first comb drive will have unstable region and/or will suffer from hysteresis.

Figure 5A:
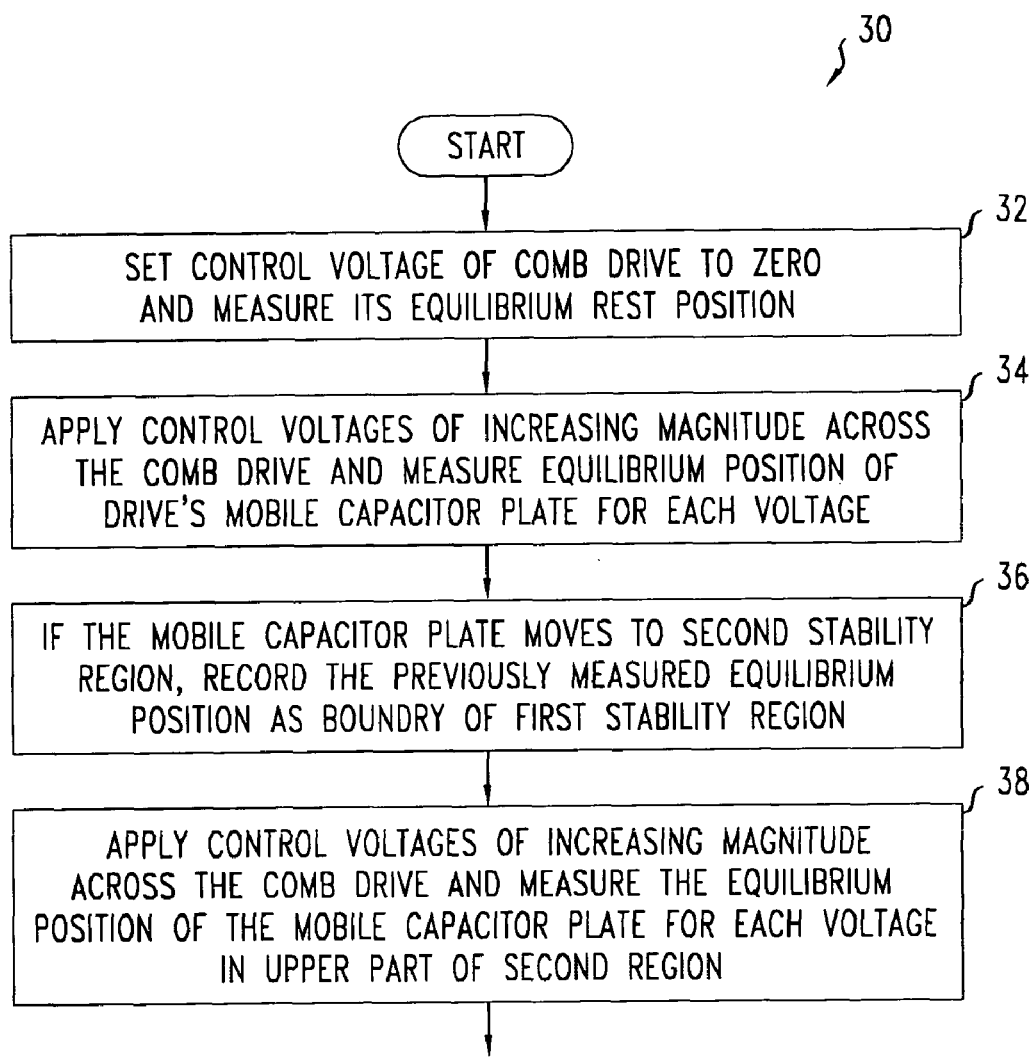
FIG. 5A-5B form a flow chart for a method of calibrating an electro-mechanical actuator having one comb drive, e.g., the electro-mechanical actuator of FIGS. 1A and 1B.
Figure 5:
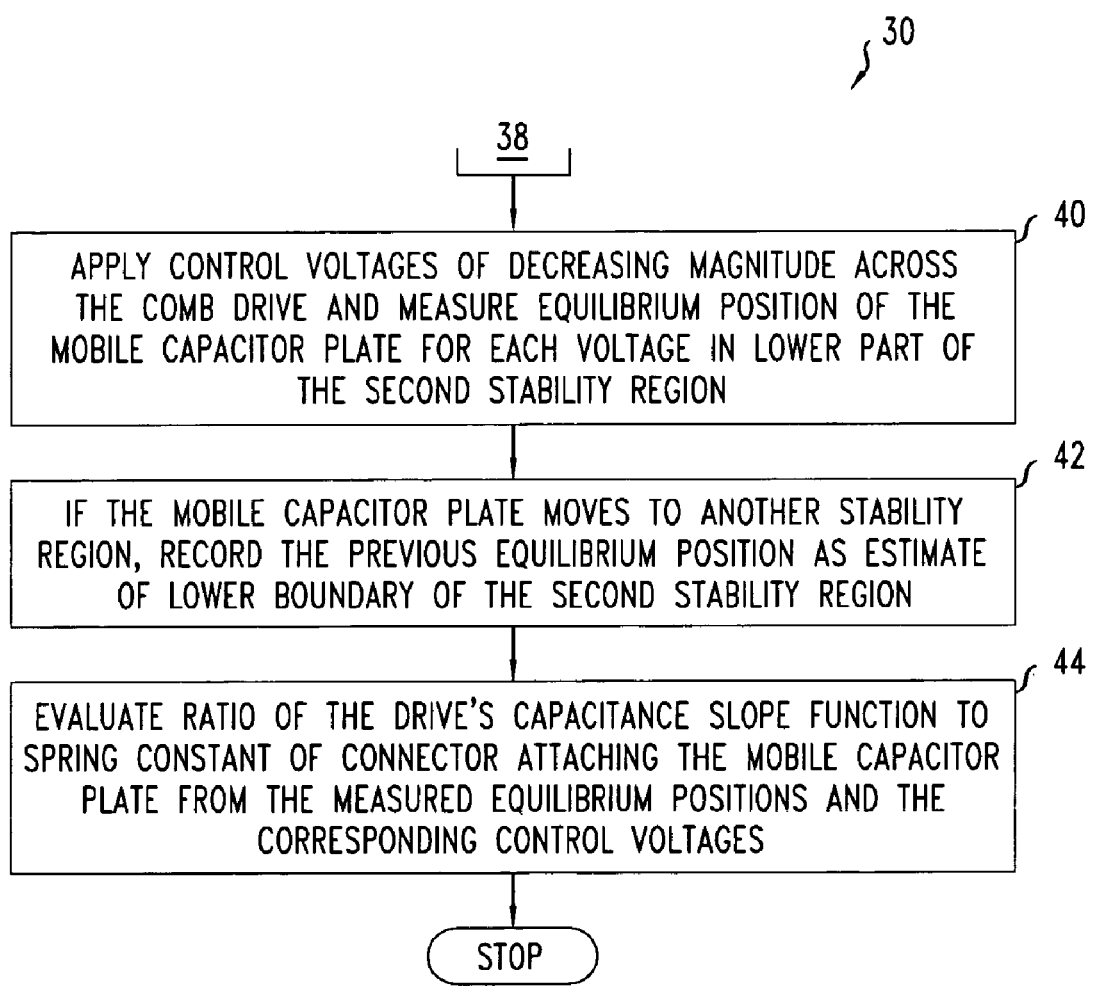

FIGS. 5A-5B illustrates a method 30 for calibrating an electro-mechanical actuator having a single comb drive, e.g., the electro-mechanical actuator 10 of FIG. 1. The calibration method 30 determines the equilibrium rest position, r, of the comb drive's mobile capacitor plate. The method 30 determines the ratio of the comb drive's capacitance slope function, $f(\Theta)$, over the spring constant, k, of deformable connector that mechanically attaches the mobile capacitor plate to a fixed support. Since the equilibrium equation (2) involves the ratio $f(\Theta)/k$, determining the control voltages needed for various equilibrium positions of the comb drive's mobile capacitor plate does not typically require a separate determination of $f(\Theta)$ and k. If the desired operating range includes more than one stability region, the method 30 includes determining the boundaries of the various stability regions, e.g., evaluating boundary coordinates $\Theta_+$ and $\Theta_-$ of the upper and lower stability regions in FIGS. 2-3.

The method 30 includes setting the control voltage, V, of the comb drive to zero and measuring the position coordinate, $\Theta$, of the comb drive's mobile capacitor plate, e.g. the mobile capacitor plate 22 (step 32). The measured position is the equilibrium rest position, r, of the mobile capacitor plate of the comb drive.

The method 30 includes applying a sequence of control voltages of increasing magnitude across the comb drive and measuring the equilibrium position of the comb drive's mobile capacitor plate for each applied control voltage (step 34). After each control voltage is applied, the mobile capacitor plate is allowed to come to equilibrium prior to the measurement of its position. In the sequence, the control voltages are gradually increased so that the measurements sweep the stability region located next to the equilibrium rest position of the mobile capacitor plate. For example, the control voltages may cause the mobile capacitor plate 22 of FIG. 1 to sweep over the lower stability region of FIGS. 2-3, e.g., values of the position coordinate $\Theta$ belonging to the range [r, $\Theta_-$).

In some embodiments, the applied control voltage may cause the mobile capacitor plate to perform a large displacement in response to only a small increase in the control voltage that is applied to the comb drive during performance of step 34. That is, the control voltage may cause the mobile capacitor plate to move from the original stability region of the comb drive to a second stability region of the comb drive, where the second stability region is physically separated from the first stability region by an intervening unstable region. For example, the magnitude of the applied control voltage may become large enough to cause some embodiments of the electro-mechanical actuator 10 of FIGS. 1A-1B to leave the lower stability region, pass through the adjacent unstable region, and enter the upper stability region as shown in FIGS. 2-3.

In response to the mobile capacitor plate moving into such a second stability region, the method 30 includes recording that the previously measured equilibrium position of the mobile capacitor plate as the boundary of one stability region of the electro-mechanical actuator (step 36). The previously measured equilibrium position would be, e.g., an estimate of the upper boundary, $\Theta_-$, of the lower stability region in FIGS. 2-3.

In such embodiments, the method 30 may also include applying a second sequence of control voltages across the comb drive and measuring the equilibrium position of the mobile capacitor plate 22 for each of the applied control voltages (step 38). In the second sequence, the applied control voltages are gradually increased so that the mobile capacitor plate comes to equilibrium prior to each measurement. These new equilibrium positions span a portion of the new stability region of the comb drive, e.g., an upper portion of the upper stability region in FIGS. 2-3.

In such embodiments, the method 30 may also include applying a third sequence of control voltages across the comb drive and again measuring the equilibrium position of the mobile capacitor plate for each applied control voltage (step 40). In the third sequence, the control voltages are gradually decreased from the last control voltage of step 34. After the application of each control voltage, the mobile capacitor plate comes to equilibrium prior to the measurement of its equilibrium position. These new measured equilibrium positions span a lower portion of the second stability region of the comb drive, e.g., the lower portion of the upper stability region in FIGS. 2-3.

In such embodiments, a small decrease of applied control voltage may again cause the mobile capacitor plate to perform a large displacement. In that case, the mobile capacitor plate has again moved to an equilibrium position in another stability region, e.g., the lower stability region of FIGS. 2-3. In response to the mobile capacitor plate making such a large displacement, the method 30 includes recording the previous equilibrium position as an estimate of the lower boundary of the second stability region (step 42). The previous equilibrium position would be, e.g., an estimate of the boundary, $\Theta_+$, of the upper stability region in FIGS. 2-3.

The method 30 includes evaluating the ratio of the comb drive's capacitance slope function to the spring constant of the deformable connector attached to the mobile capacitor plate from the measured equilibrium positions and corresponding measured values of the control voltage (step 44). The evaluating step includes solving equilibrium equation (2) for each measured value of the equilibrium position, $\overline{\Theta}$, and associated measured value of the control voltage, i.e., for a $\overline{W}$. In particular, the steps of solving produce a list of calibration values for the control voltages and corresponding equilibrium positions in the portions of the one or two stability regions of the electro-mechanical actuator where its operation is desired. Some embodiments may use a linear regression and/or prior knowledge of a parametric form for the capacitor slope function, $f(\Theta)$, e.g., by fitting the measured values to functions having few parameters. Such techniques may aid to more rapidly and/or accurately estimate the capacitance slope function from the calibration measurements.

After performing calibration method 30, the electro-mechanical controller can be operating in the stability regions that have been calibrated. With respect to the electro-mechanical actuator described by FIGS. 2-3, those regions may include the lower stability region, the upper stability region, or both stability regions. In particular, the boundaries, i.e., r, $\Theta_-$, and $\Theta_+$, of these regions can be estimated by the method 30.

Figure 6:
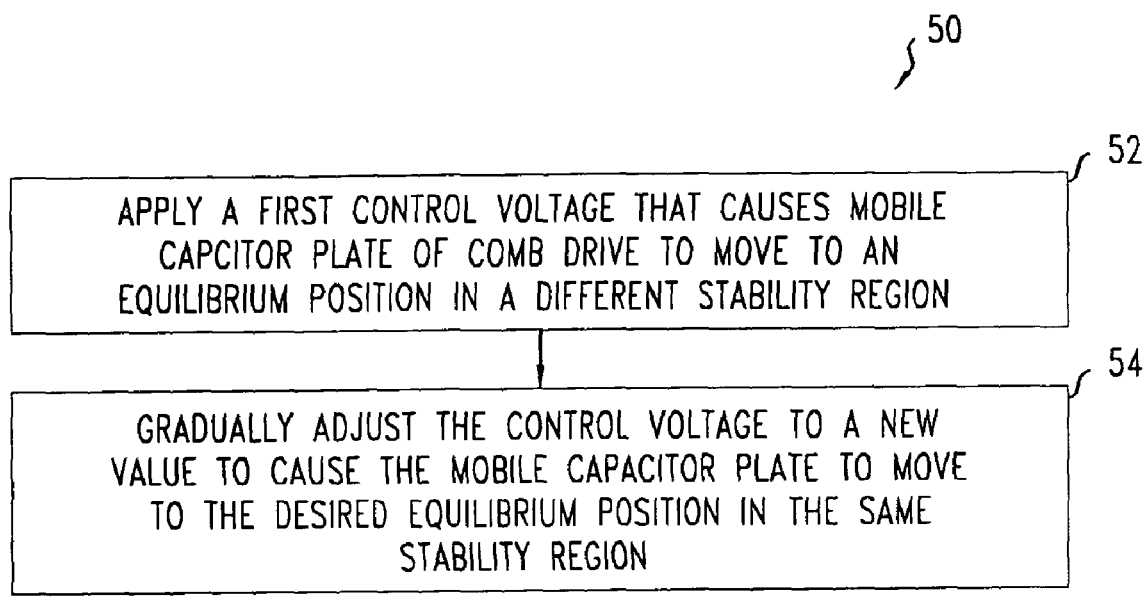
FIG. 6 is a flow chart for a method of operating an electro-mechanical actuator, e.g., a MEMS actuator, whose mobile capacitor plate can have more than one equilibrium position for the same control voltage, e.g., the electro-mechanical actuator of FIGS. 1A, 1B, and 3.

An exemplary method 50 for operating the electro-mechanical controller 10 after calibration, e.g., via the method 30 of FIG. 5A-5B, is illustrated in FIG. 6. The method 50 enables operating the electro-mechanical controller 10 in both engaged and disengaged regions of the comb drive 12. The method 50 also controls the comb drive 12 in a manner that avoids positioning uncertainties associated with hysteresis even though some of the control voltages are capable of producing more than one equilibrium position for the mobile capacitor plate 22.

Referring to FIG. 6, the method 50 includes applying a first control voltage that causes the mobile capacitor plate 22 of the comb drive 12 to move to an equilibrium position in a desired stability region, i.e., the upper stability region or the lower stability region (step 52). To ensure positioning of the mobile capacitor plate 22 in the upper stability region, the applied control voltage must be larger than any control voltage capable of producing multiple equilibrium positions for the mobile capacitor plate 22. In the embodiment of FIGS. 2-3, the applied voltage would have to be larger than the control voltage associated with the line B. To ensure positioning of the mobile capacitor plate 22 in the lower stability region, the applied control voltage must be smaller than any control voltage capable of producing multiple equilibrium positions for the mobile capacitor plate 22. In the embodiment of FIGS. 2-3, the applied voltage would have to be smaller than the control voltage associated with the line A, e.g., a control voltage of zero. The calibration method 30 would determine values of the control voltages suitable to perform above step 52.

The method 50 includes gradually adjusting the control voltage to a new value that is suitable for causing the mobile capacitor plate 22 to move to the desired equilibrium position in the same stability region (step 54). Since the control voltage is changed gradually, the mobile capacitor plate 22 will be displaced through a series of nearby stable equilibrium positions as it moves to the desired equilibrium position, i.e., without jumping to a physically separate stability region.

Other embodiments of electro-mechanical actuators have more than one comb drive. In such electro-mechanical actuators, movements of the mobile capacitor plates of different ones of the comb drives may be mechanically linked. In such electro-mechanical actuators, different control voltages may also be applied to the different ones of the comb drives. Exemplary electro-mechanical actuators 10', 10" with multiple comb drives are illustrated in FIGS. 7-9.

Figure 7:
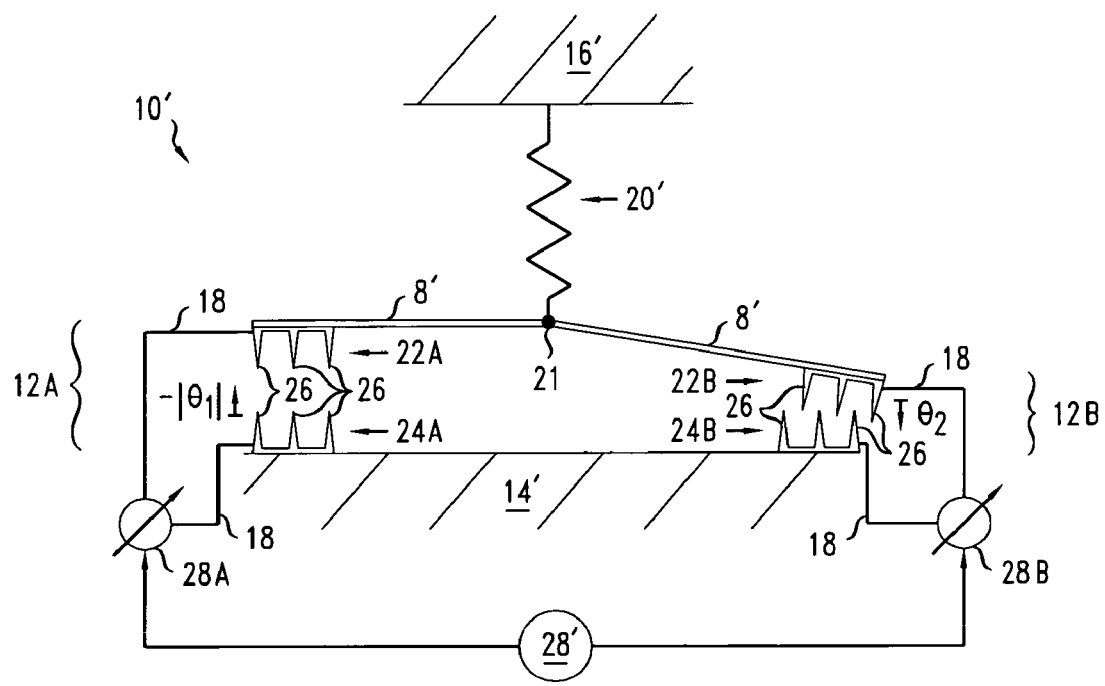
FIG. 7 is a schematic side view of an electro-mechanical actuator that has two comb drives, e.g., a MEMS actuator.

FIG. 7 schematically illustrates an electro-mechanical actuator 10' that has two comb drives 12A, 12B. Each comb drive 12A, 12B includes a mobile capacitor plate 22A, 22B and a fixed capacitor plate 24A, 24B. The fixed capacitor plates 24A, 24B are rigidly fixed to an immobile support substrate 14'. The mobile capacitor plates 22A, 22B are rigidly fixed to opposite ends of a resilient bar 8', e.g., a rigid bar or a torsion bar. Each capacitor plate 22A, 22B, 24A, 24B has conductive teeth 26 that can inter-digitate with the teeth 26 of the other capacitor plate 22A, 22B, 24A, 24B of the same comb drive 12A, 12B. The bar 8' mechanically connects the capacitor plates 22A, 22B of the two comb drives. The center 21 of the bar 8' attaches to one end of a deformable connector 20' and provides a pivot point for the bar 8'. The other end of the deformable connector 20' attaches to immobile support 16'. The deformable connector 20' provides a restoring force to the center 21 of the bar 8'.

The electro-mechanical actuator 10' also includes a first variable voltage source 28A, a second variable voltage source 28B, and an electronic controller 28'. Each variable voltage source 28A, 28B is electrically connected across a corresponding one of the comb drives 12A, 12B. Thus, the variable voltage sources 28A, 28B can apply the same or different control voltages to the comb drives 12A, 12B of the electro-mechanical actuator 10'. The electronic controller 28' is a smart device, e.g., a processor, that is able to determine, control, and synchronize values of the control voltages that are applied by the individual voltage sources 28A, 28B. For example, the electronic controller 28' may implement control voltages that cause one comb drive 12A, 12B to be engaged while the other comb drive 12B, 12A is simultaneously disengaged or simultaneously engaged. The electronic controller 28' may also be configured to enable the various comb drives 12A, 12B to push against each other and/or to operate the comb drives 12A, 12B during calibration as described below. The electronic controller 28' may also be configured to perform one of the below-described methods for operating an electro-mechanical actuator, e.g., method 90 of FIG. 11 and alternate embodiments thereto.

Figure 8A:
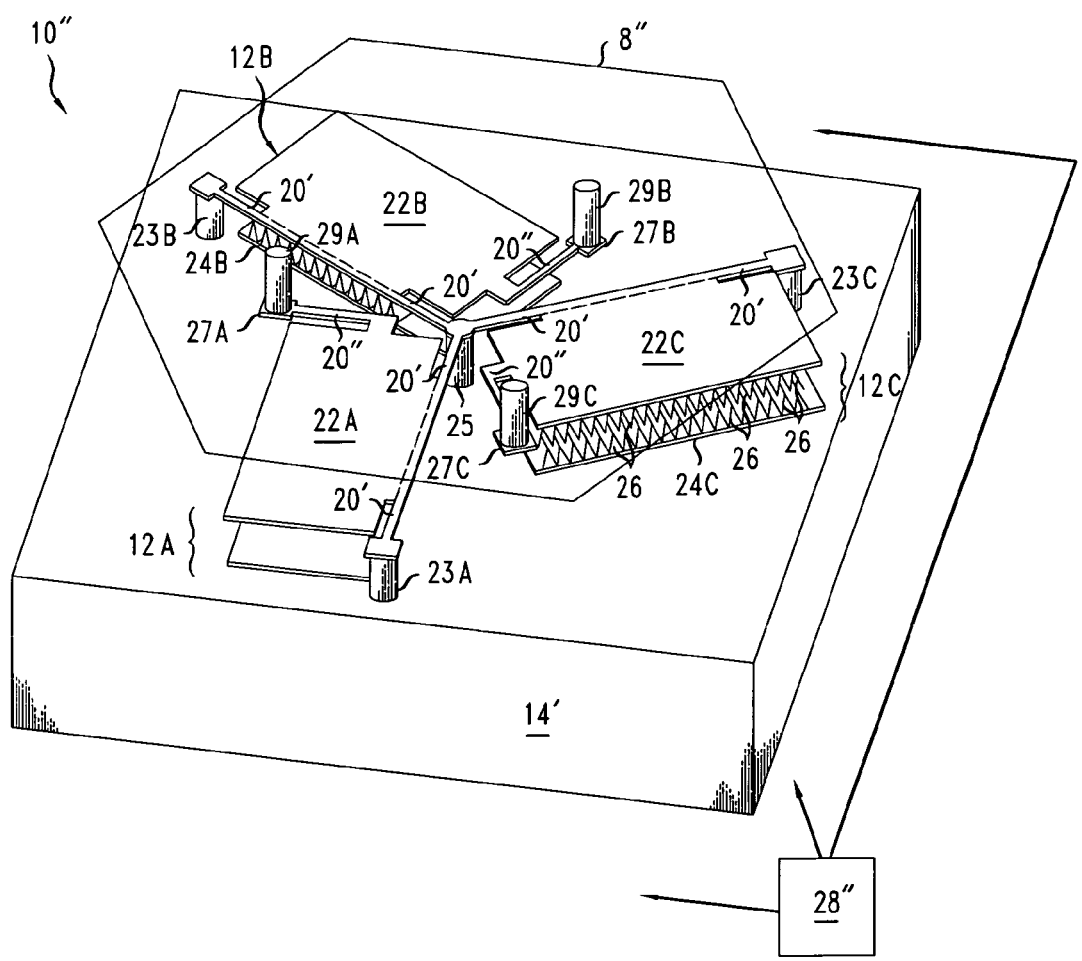
FIGS. 8A and 8B show oblique views of electro-mechanical actuators, e.g., MEMS actuators, with three comb drives and four comb drives, respectively.
Figure 9:
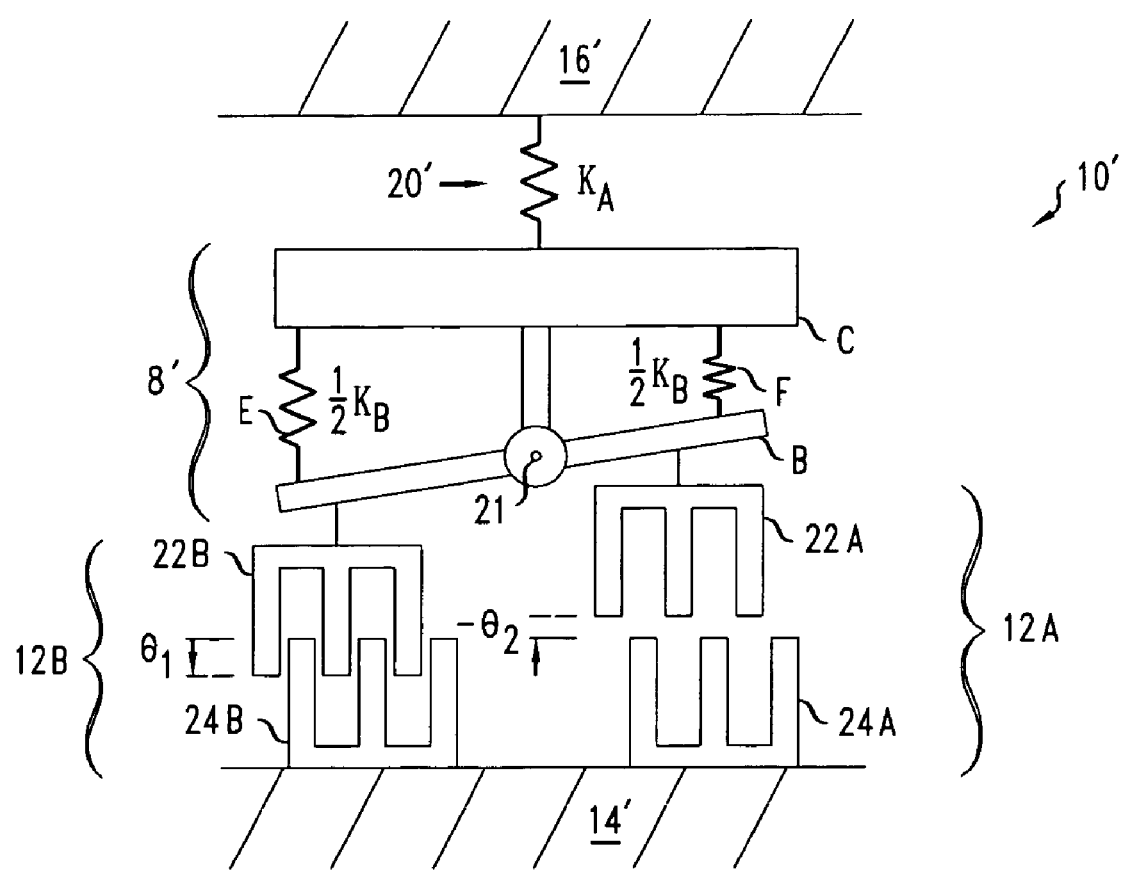
FIG. 9 is a side view of a model that illustrates mechanical interactions between the elements of the electro-mechanical actuator of FIG. 7.

FIG. 8A shows an electro-mechanical actuator 10" with three comb drives 12A, 12B, 12C. The electro-mechanical actuator 10" also includes torsion bars 20'; second bars 20";

side support posts 23A, 23B, 23C; center support post 25; attachment points 27A, 27B, 27C; and coupling posts 29A, 29B, 29C.

In the electro-mechanical actuator 10", each comb drive 12A, 12B, 12C includes one mobile capacitor plate 22A, 22B, 22C and one fixed capacitor plate 24A, 24B, 24C. Both capacitor plates 22A, 22B, 22C, 24A, 24B, 24C include rows of parallel conductive teeth 26 that can inter-digitate with the teeth 26 of the other capacitor plate 22A, 22B, 22C, 24A, 24B, 24C of the same comb drive 12A, 12B, 12C. Each mobile capacitor plate 22A, 22B, 22C is physically suspended by a corresponding one of the torsion bars 20'. Each torsion bar 20' physically connects to one side support post 23A, 23B, 23C and to the center support post 25. The support posts 23A, 23B, 23C, 25 rigidly connect to the support substrate 14'. Each mobile capacitor plate 22A, 22B, 22C also connects by one of the second bars 20" to a corresponding attachment point 27A, 27B, 27C. Each attachment point 27A, 27B, 27C transfers movements of its associated mobile capacitor plate 22A, 22B, 22C to its associated coupling post 29A, 29B, 29C. In turn, each coupling post 29A, 29B, 29C transfers such movement to a plate-like structure 8", e.g., an optical mirror. The fixed capacitor plates 24A, 24B, 24C are rigidly fixed to the top surface of the support substrate 14' in an immobile manner.

During operation, a separate variable voltage source (not shown) applies a control voltage to each comb drive 12A, 12B, 12C thereby causing the associated mobile capacitor plates 22A, 22B, 22C to rotate. The mobile capacitor plates 22A, 22B, 22C can rotate due to their physical connections to the torsion bars 20'. The second bars 20" pass motions of the mobile capacitor plates 22A, 22B, 22C to the plate-like structure 8". Due to the presence of three comb drives 12A, 12B, 12C, the electro-mechanical actuator 10" is able to vertically displace the plate-like structure 8" and rotate the plate-like structure 8" about two axes.

The electro-mechanical actuator 10" also includes an electronic controller 28", i.e., a smart device such as a processor. The electronic controller 28" is connected and configured to determine, control, and synchronize the values of the control voltages that are applied by the individual variable voltage sources to the comb drives 12A, 12B, 12C. For example, the electronic controller 28" may be able to implement control voltages that cause one comb drive 12A, 12B, 12C to be engaged while another comb drive 12B, 12A, 12C is simultaneously disengaged or simultaneously engaged. The electronic controller 28" may also be configured to enable the various comb drives 12A, 12B, 12C to push against each other and/or to operate the comb drives 12A, 12B, 12C during calibration as described below. The electronic controller 28" may also be configured to perform one of the below-described methods for operating an electro-mechanical actuator, e.g., method 90 of FIG. 11 and alternate embodiments thereto.

Other embodiments may incorporate similar structural elements to produce electro-mechanical actuators having more than three comb drives. For example, FIG. 8B shows an electro-mechanical actuator 10''' having four comb drives 12A, 12B, 12C, 12D.

Figure 8B:
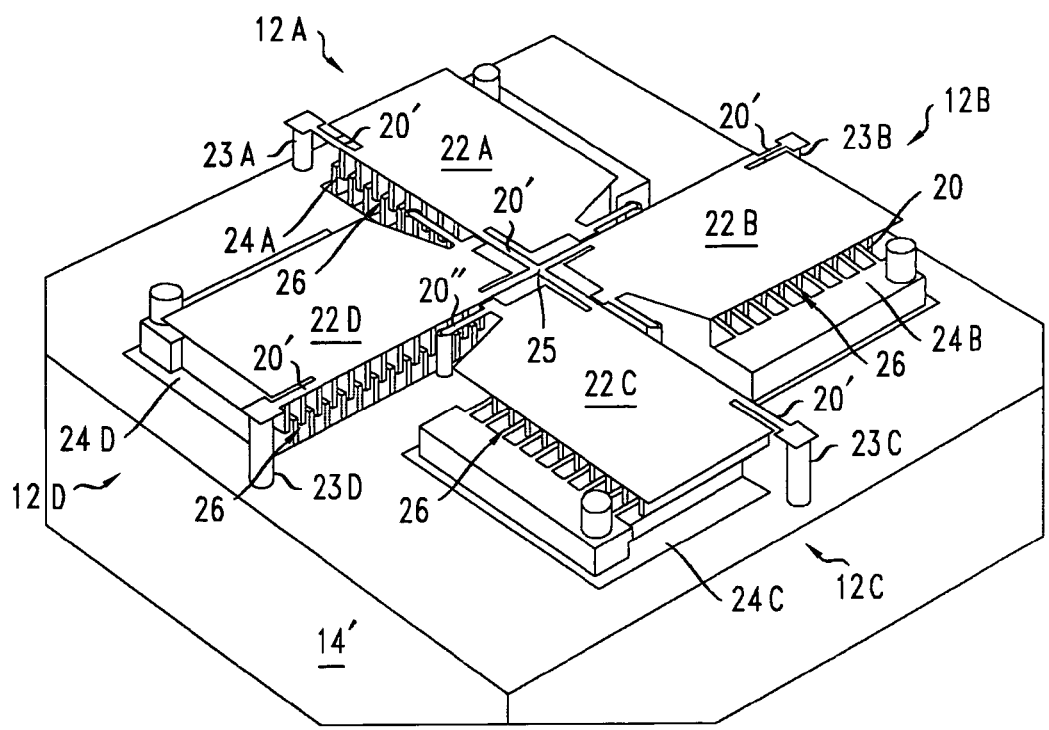

FIG. 8B shows an electro-mechanical actuator 10''' with four comb drives 12A, 12B, 12C, 12D. The electro-mechanical actuator 10''' also includes torsion bars 20'; second bars 20"; side support posts 23A, 23B, 23C, 23D; center support post 25; and attachment points for an object (not shown) that is manipulated or positioned by the electro-mechanical actuator 10'''. The comb drives 12A, 12B, 12C, 12D have mobile capacitor plates 22A, 22B, 22C, 22D and fixed capacitor plates 24A, 24B, 24C, 24D located on the support substrate 14'. In the electro-mechanical actuator 10''' the labeled elements have similar functions to similarly labeled elements of the electro-mechanical actuator 10" of FIG. 8A.

During operation, four or less variable voltage sources (not shown) may apply control voltages to the comb drive 12A, 12B, 12C, 12D, i.e., independent of dependent control voltages. The applied voltages cause the associated mobile capacitor plates 22A, 22B, 22C, 22D to rotate due to their physical connections to the torsion bars 20'. The second bars 20" pass motions of the mobile capacitor plates 22A, 22B, 22C, 22D to the structure being positioned or manipulated (not shown).

The electro-mechanical actuator 10''' also includes an electronic controller (not shown), i.e., a smart device such as a processor, which is connected and configured to determine, control, and synchronize the values of the control voltages that are applied by the individual variable voltage sources to the comb drives 12A, 12B, 12C, 12D. For example, the electronic controller may be able to implement control voltages that cause some comb drives 12A-12D to be engaged while another comb drive 12B-12D is simultaneously disengaged. The electronic controller 28" may also be configured to enable the various comb drives 12A-12D to push against each other and/or to operate the comb drives 12A-12D during calibration method 60 and/or operation method 90 as described below.

Conventional fabrication techniques and materials for making micro-electronics and micro-electrical-mechanical system (MEMS) devices can be used to make embodiments of electro-mechanical actuators 10, 10', 10" shown in FIGS. 1A-1B and 7- 8. Descriptions of such techniques may be found in: U.S. patent application Ser. Nos. 10/813,951 and/or 11/140,313, which have been incorporated by reference herein in their entirety. Descriptions of such techniques may also be found in, U.S. Patent Publication 2004/0179773 of V. Aksyuk et al, and/or "Electrostatic-comb Drive of Lateral Polysilicon Resonators" by William C. Tang et al, Sensors and Actuators, A21-A23 (1990) pages 328-331. These last two documents are also incorporated by reference herein in their entirety.

FIG. 9 provides a mechanical model for the electro-mechanical actuator 10' with two comb drives 12A, 12B as shown in FIG. 7. The mechanical model can help in explaining the motion equation of the electro-mechanical actuator 10'. In the mechanical model, the bar 8' is functionally modeled by rigid bars B and C, wherein the rigid bars B and C are rotatably joined at the center 21. A rotation subjects the rigid bars B and C to restoring forces from compressible springs E and F. The springs E, F have spring constants $(½)K_B$. In the model, the deformable connector 20' is modeled by a spring whose spring constant is $K_A$.

Based on the model, the mechanical contribution, $E_M$, to the potential energy of the electro-mechanical actuator 10' is given by:

$$E_M = (K_A/2)[(\Theta_1+\Theta_2)/2]^2 + (K_B/2)[(\Theta_1-\Theta_2)/2]^2, \quad (5a)$$

and the electrostatic contribution, $E_S$, to the potential energy is given by:

$$E_S = -C_1(\Theta_1)(V_1/2)^2 - C_2(\Theta_2)(V_2/2)^2 \quad (5b)$$

Here, $\Theta_1$ and $\Theta_2$ are the positions of the mobile capacitor plate 22A and the mobile capacitor plate 22B, respectively. Also, $C_1(\Theta_1)$ and $C_2(\Theta_2)$ are the capacitances of, and $V_1$ and $V_2$ are the control voltages applied across the comb drive 12A and the comb drive 12B, respectively. Since the potential energy is ($E_M$+$E_S$), the mobile capacitor plates 22A, 22B obey the following motion equation:

$$M \cdot \ddot{\Theta} = W * f(\Theta) - K \cdot (\Theta - r) + F_D(\dot{\Theta}). \quad (6)$$

Here, $\Theta^T = (\Theta_1, \Theta_2)$, $[f(\Theta)]^T = (f_1(\Theta_1), f_2(\Theta_2))$, $W^T = ((V_1/2)^2, (V_2/2)^2)$, and $[a*b]^T = (a_1 b_1, a_2 b_2)$. Also, M is a 2×2 diagonal mass matrix, and $F_D(\dot{\Theta})$ is a dissipative force. The 2×2 matrix K is a spring constant matrix, which is given by:

$$K = \frac{1}{4}\begin{bmatrix} K_A + K_B & K_A - K_B \\ K_A - K_B & K_A + K_B \end{bmatrix}. \quad (7)$$

In an equilibrium configuration $\ddot{\Theta} = \dot{\Theta} = 0$, and motion equation (6) for the electro-mechanical actuator 10' with two comb drives 12A, 12B becomes:

$$\overline{W} * f(\overline{\Theta}) = K \cdot (\overline{\Theta} - r). \quad (8)$$

The solutions of the equilibrium equation (8) define the magnitudes of the control voltages that are required to keep the electro-mechanical actuator 10' in the equilibrium position where the mobile capacitor plates 22A, 22B are at the coordinate position $\overline{\Theta}$.

In electro-mechanical actuators with more than two comb drives, the motion and equilibrium equations generalize equations (6) and (8). In an electro-mechanical actuator with N comb drives where N>2, e.g., the electro-mechanical actuator 10'' of FIG. 8, the potential energy again has mechanical and electrostatic contributions. The value of each contribution depends on the positions, i.e., $\Theta_1, \ldots, \Theta_N$, of the N mobile capacitor plates of the comb drives from their just engaged positions. Here, the p-th position, $\Theta_p$, measures the displacement of the p-th mobile capacitor plate from its just engaged position with the other capacitor plate of the same p-th comb drive. Also, each position, $\Theta_p$, is defined as being positive when the corresponding p-th mobile capacitor plate is, at least, partially engaged with the other capacitor plate of the same comb drive and is defined as being negative when the p-th mobile capacitor plate is disengaged from the other capacitor plate of the same p-th comb drive.

For an electro-mechanical actuator with N comb drives, the mechanical contribution, $E_M$, to the potential energy is the energy that is stored in deformable connectors to which the mobile capacitor plates of the N comb drives are attached. Typically, the mechanical contribution is approximately given by:

$$E_M = (\tfrac{1}{2})(\Theta - r)^T \cdot K \cdot (\Theta - r). \quad (9)$$

Here, the N-dimensional vectors $\Theta$ and r are defined by $\Theta^T = (\Theta_1, \ldots, \Theta_N)$ and $r = (r_1, \ldots, r_N)$, respectively. The p-th component $r_p$ of the vector r is the actual equilibrium rest position of the mobile capacitor plate of the p-th comb drive. That is, the value of $r_p$ is the actual equilibrium position of the p-th mobile capacitor plate when no control voltages are applied to any of the N comb drives. The N×N matrix K is referred to as the spring constant matrix. The spring constant matrix defines how the mechanical contribution to the potential energy depends on the differences between the positions $\Theta_1, \ldots, \Theta_N$ of the mobile capacitor plates and their corresponding actual equilibrium rest positions $r_1, \ldots, r_N$. The matrix K is symmetric and has positive eigenvalues. The values of matrix K are determined by the set of deformable connectors that attach the mobile capacitor plates to immobile support structures.

The electrostatic contribution, $E_S$, to the potential energy is the energy that is stored in the comb drives. Thus, the electrostatic contribution is given by:

$$E_S = -W^T \cdot C(\Theta). \quad (10)$$

Here, the components of the N-dimensional vector $C(\Theta)$ are the individual capacitances of the N comb drives, i.e., $[C(\Theta)]^T = (C_1 \Theta_1, \ldots, C_N(\Theta_N))$. The value of each of the capacitance depends on the position of the mobile capacitor plate of the same comb drive, e.g., $C_j(\Theta_j)$ for the j-th comb drive. The components of the N-dimensional vector W are one half times the squares of the control voltages that are applied to the individual comb drives, i.e., $W_p = (V_p)^2/2$ for $p = 1, \ldots, N$.

Since the total potential energy is $E_M + E_S$, the motion equation for an electro-mechanical with N comb drives is given by:

$$M \cdot \ddot{\Theta} = W * f(\Theta) - K \cdot (\Theta - r) + F_D(\dot{\Theta}). \quad (11)$$

Here, the N×N matrix M is a diagonal mass matrix, and the N-dimensional vector $F_D(\dot{\Theta})$ is the velocity-dependent dissipative force. The N-dimensional vector $f(\Theta)$ defines the capacitance slope functions and is given by:

$$f(\Theta)^T = (f_1(\Theta_1), \ldots, f_N(\Theta_N)) = (\partial_{\Theta_1} C_1(\Theta_1), \ldots, \partial_{\Theta_N} C_N(\Theta_N)). \quad (12)$$

Finally, on N-dimensional vectors $Q^T = (Q_1, \ldots, Q_N)$ and $P^T = (P_1, \ldots, P_N)$, the bilinear operator "*" is defined as: $[Q*P]^T = (Q_1 P_1, \ldots, Q_N P_N)$.

At equilibrium, the accelerations and velocities of the mobile capacitor plates of the comb drives vanish, and motion equation (11) becomes:

$$\overline{W} * f(\overline{\Theta}) = K \cdot (\overline{\Theta} - r) \quad (13)$$

Here, $\overline{\Theta}$ defines the equilibrium positions of the N mobile capacitor plates, and $\overline{W}$ defines the magnitudes of the control voltages that are applied to the N comb drives. The equilibrium equation (13) can be rewritten as: $\overline{W} = [f^{-1}(\overline{\Theta})] * [K \cdot (\overline{\Theta} - r)]$ where $[f^{-1}(\Theta)]^T = (1/f_1(\Theta_1), \ldots, 1/f_N(\Theta_N))$. Motion equation (11) can be expanded in fluctuations, i.e., $x = \Theta - \overline{\Theta}$, to obtain:

$$M \cdot \ddot{x} = \overline{W} * x * \partial_\Theta f(\overline{\Theta}) - K \cdot x + F_D(\dot{x}). \quad (14)$$

Here, $[\partial_\Theta f(\overline{\Theta})]^T = (\partial_{\Theta_1} f_1(\Theta_1), \ldots, \partial_{\Theta_N} f_N(\Theta_N))$. For an equilibrium configuration to be stable, the effective spring constant matrix, i.e., $K_{\textit{eff-equil}}$, must typically have only positive definite eigenvalues. The effective spring constant matrix $K_{\textit{eff-equil}}$ is defined as:

$$K_{\textit{eff-equil}}(\overline{\Theta}) = K - \text{diag}[\partial_\Theta f(\overline{\Theta}) * \overline{W}]. \quad (15)$$

Herein, diag(N-vector) is an N×N diagonal matrix whose k-th diagonal entry is the k-th component of the vector. From the above-described form for $\overline{W}$, $K_{\textit{eff-equil}}(\overline{\Theta})$ can be rewritten as:

$$K_{\textit{eff-equil}}(\overline{\Theta}) = K - \text{diag}[\partial_\Theta f(\overline{\Theta}) * [f^{-1}(\overline{\Theta})] * [K \cdot (\overline{\Theta} - r)]] \quad (16)$$

Equation (16) shows that $K_{\textit{eff-equil}}(\overline{\Theta})$ only depends on the capacitance slope functions of the comb drives and the spring constants of the deformable connectors to which the mobile capacitor plates of the comb drives are attached.

The capacitance of a comb drive is often approximately linear in the position of the comb drive's mobile capacitor plate when the position of the mobile capacitor plate is greater than a positive threshold. In such situations, the comb drive and its mobile capacitor plate will be referred to as being strongly engaged.

In some embodiments of electro-mechanical actuators with multiple comb drives, the mobile capacitor plate of each comb drive is strongly engaged during operation. In such an electro-mechanical actuator, there is an invertible relationship between the vector of equilibrium positions, $\bar{\Theta}$, and the N vector, $\bar{W}$, which relates to the control voltages.

In some electro-mechanical actuators, up to "m" comb drives are not strongly engaged any equilibrium configuration. In such situations, the stability analysis for the electro-mechanical actuators can be based on an effective electro-mechanical actuator having only the m comb drives that are not strongly engaged. The effective electro-mechanical actuator may be used to design, calibrate, and/or operate an actual electro-mechanical actuator, but may be simpler to use. In some special electro-mechanical actuators of the type just described, only a single comb drive is not strongly engaged at any operational equilibrium configuration.

In such equilibrium configurations, to describe the effective electro-mechanical actuator, the various objects and equations are expressed in block form. In the block form, the first "m" positions, i.e., $\Theta_1, \ldots, \Theta_m$, refer to positions of the "m" mobile capacitor plates that are not strongly engaged. The last "N−m" positions, i.e., $\Theta_{m+1}, \ldots, \Theta_N$, refer to positions of the mobile capacitor plates that are strongly engaged. Similarly, $[W_1]^T \equiv (W_1, \ldots, W_m)$, $[W_2]^T \equiv (W_{m+1}, \ldots, W_N)$, $[\Theta_1]^T \equiv (\Theta_1, \ldots, \Theta_m)$ $[\Theta_2]^T \equiv \Theta_{m+1}, \ldots, \Theta_N)$, $[\partial_\Theta f]^T \equiv (\partial_\Theta f_1, \partial_\Theta f_2)$, $[\partial_\Theta f_1]^T \equiv (\partial f_1(\Theta_1), \ldots, \partial f_m(\Theta_m))$ and $[\partial_\Theta f_2]^T \equiv (\partial f_{m+1}(\Theta_{m+1}), \ldots, \partial f_N(\Theta_N))$. In the block form, the spring constant matrix, K, is rewritten with an m×m matrix $K_{11}$, an m×(N−m) matrix $K_{12}$, an (N−m)×m matrix $K_{22}$, and an (N−m)×(N−m) matrix $K_{22}$ as follows:

$$K = \begin{bmatrix} K_{11} & K_{12} \\ K_{21} & K_{22} \end{bmatrix}. \tag{17}$$

Since K has positive eigenvalues, $K_{22}$ and its Schur complement, A, have positive eigenvalues. Here, $A = K_{11} - K_{12}[K_{22}]^{-1}K_{21}$. In the block form, equation (15) for the effective spring constant matrix becomes:

$$K_{\textit{eff-equil}}(\bar{\Theta}) = \begin{bmatrix} K_{11} - \textit{diag}(W_1 * [\partial_\Theta f(\Theta)]) & K_{12} \\ K_{21} & K_{22} \end{bmatrix}. \tag{18}$$

In the block form, equilibrium equation (13) can be written as:

$$K_{11} \cdot (\Theta_1 - r_1) + K_{12} \cdot (\Theta_2 - r_2) = W_1 * f_1(\Theta_1), \text{ and} \tag{20a}$$

$$K_{21} \cdot (\Theta_1 - r_1) + K_{22} \cdot (\Theta_2 - r_2) = W_2 * \sigma_2. \tag{20b}$$

Here, $f_2(\Theta_2) = \sigma_2$ with $\sigma_2$ being approximately constant, because the capacitance slope function of a comb drive is approximately constant when the comb drive is strongly engaged. From equation (20b), one can solve for $(\Theta_2 - r_2)$, because $K_{22}$ is invertible. Inserting the solution for $(\Theta_2 - r_2)$ in equation (20a) shows that:

$$A \cdot [\Theta_1 - r_1 + A^{-1} \cdot K_{12} \cdot K_{22}^{-1} \cdot (\sigma_2 * W_2)] = W_1 * f_1(\Theta_1) \tag{21}$$

That is, the "m" comb drives that are not strongly engaged form an effective mechanical system. From equation (21), the m×m matrix A functions as an effective spring constant matrix in the effective system described by the positions, $\Theta_1$, i.e., the positions of the m mobile capacitor plates that are not strongly engaged. Similarly, the m-component vector $[r_1 - A^{-1} \cdot K_{12} \cdot K_{22}^{-1} \cdot (\sigma_2 * W_2)]$ functions as the effective equilibrium rest position vector, $r_{1, \textit{eff}}$, for the positions, $\Theta_1$, of the m mobile capacitor plates that are not strongly engaged. The effective spring constant matrix A and $r_{1, \textit{eff}}$ are simple scalars when m=1.

In various embodiments of electro-mechanical actuators with multiple comb drives are configured to operate in regions where not every comb drive is strongly engaged. In some embodiments, (N−1) comb drives are strongly engaged, and the remaining comb drive is not strongly engaged. In electro-mechanical actuators with many comb drives, it may be desirable to allow one comb drive to be disengaged. For example, allowing such complex operating conditions may enable extending the range of configurations of electro-mechanical actuators substantially over similar electro-mechanical actuators except that all comb drives are kept strongly engaged.

An electro-mechanical actuator with multiple comb drives should typically be calibrated prior to use. The calibration determines the N actual equilibrium rest positions, i.e., r, of the mobile capacitor plates of the N comb drives, the N capacitance slope functions $f(\Theta)$ in a selected operating region, and the spring constant matrix K. Since the equilibrium equation (13) involves ratios of the capacitance slope function and the spring constant matrix, the diagonal elements of $K^{-1}$ can be set to 1 without loss of any information with respect to the values of the control voltages in equilibrium configurations.

Figure 10A:
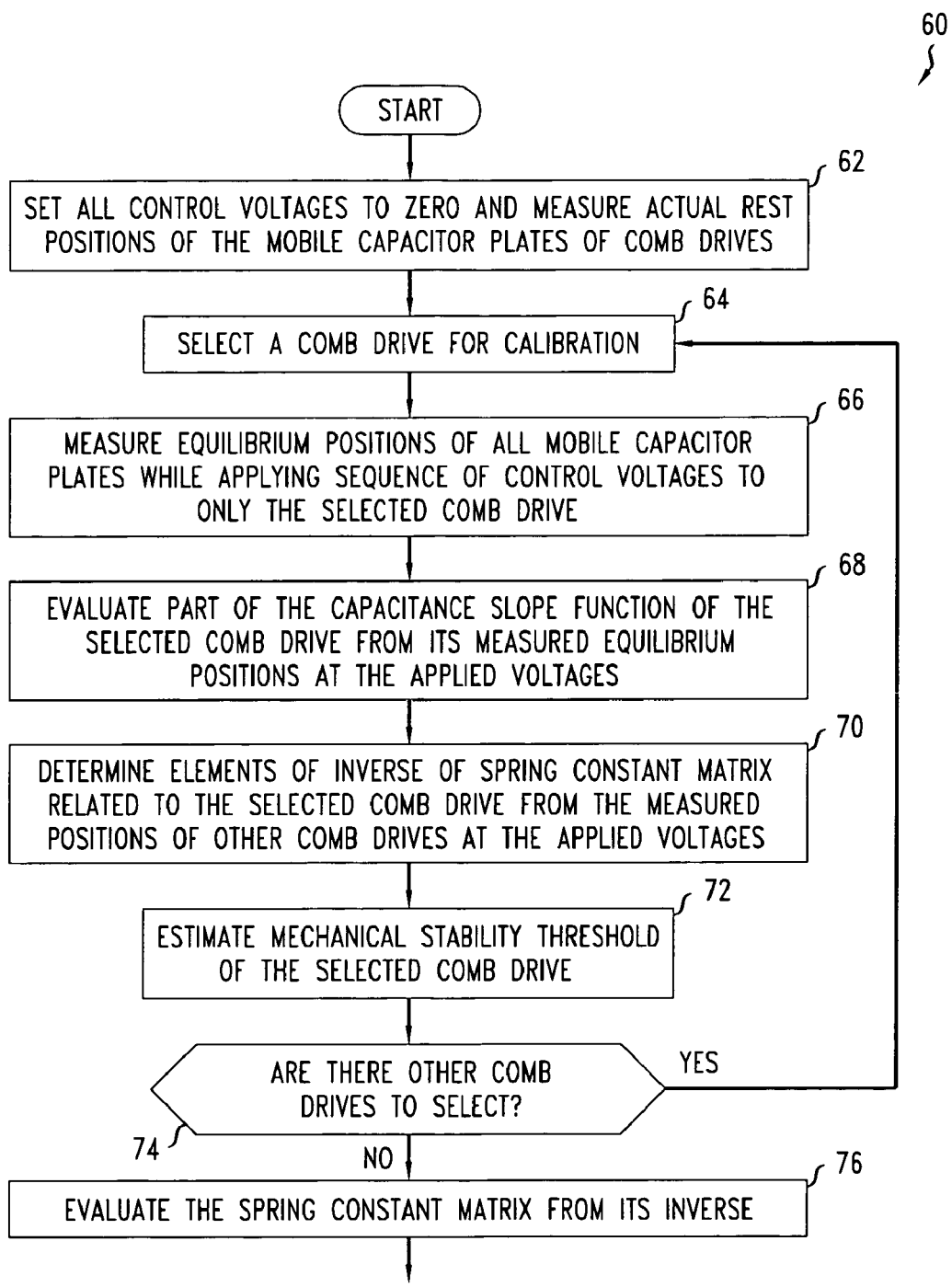
FIGS. 10A and 10B form a flow chart that illustrates a method of calibrating an electro-mechanical actuator with more than one comb drive, e.g., a MEMS actuator.
Figure 10B:
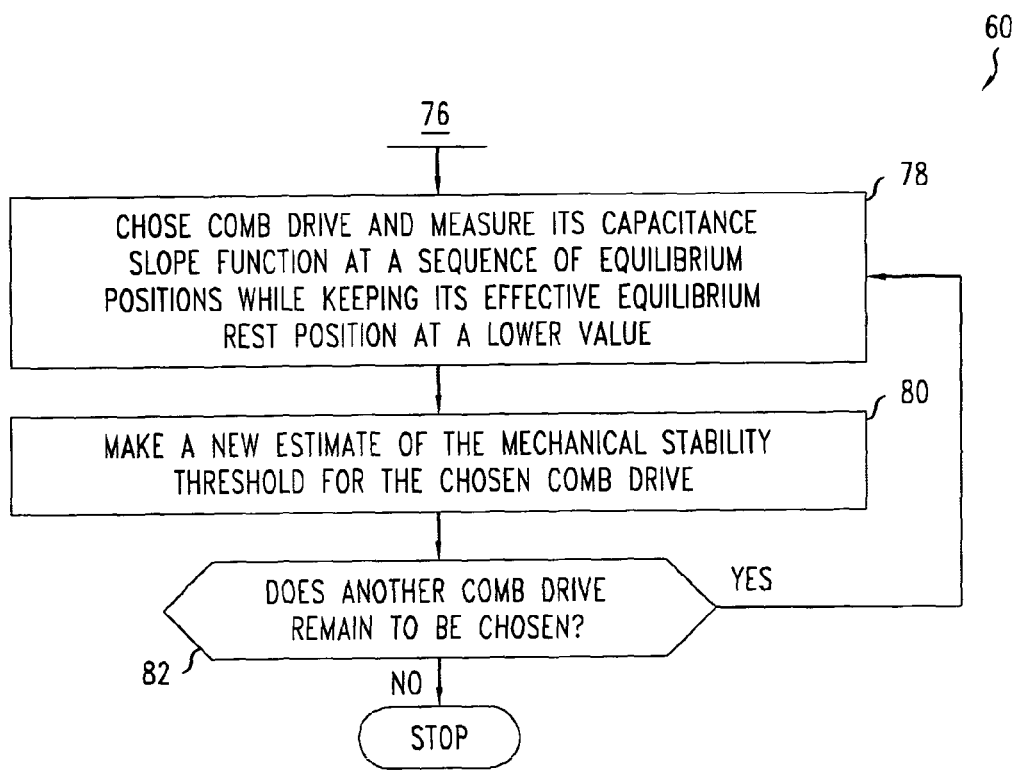

A method 60 for calibrating an electro-mechanical actuator with multiple comb drives is illustrated in FIGS. 10A-10B. In addition to determining the above-listed properties of the electro-mechanical actuator, the method 60 also estimates the mechanical stability threshold of each individual comb drive of the electro-mechanical actuator, i.e., the vector $\bar{r'} = (\bar{r_1}, \ldots, \bar{r_N})$, is estimated.

The method 60 includes a first stage process and an optional second stage process. In the first stage process, only one comb drive has a nonzero control voltage at any one time. The first stage process determines the spring constant matrix K, the strongly engaged behavior of the comb drives, and a portion of the capacitance slope function of each comb drive. In the second stage process, each comb drive is in a strongly engaged configuration at any one time except the comb drive being calibrated. The second stage may determine additional parts of the capacitance slope function of one or more of the individual comb drives.

Since the equilibrium equation (13) involves ratios of the capacitance slope function and the spring constant matrix, the diagonal elements of $K^{-1}$ can be scaled without losing information about values of control voltages in equilibrium configurations. Thus, the description below assumes that the diagonal elements of $K^{-1}$ are scaled to be equal to one.

In the first stage process, the method 60 includes setting the control voltages of all comb drives to zero and measuring the equilibrium positions, $\Theta$, of the mobile capacitor plates of the comb drives (step 62). These measured equilibrium positions correspond to the actual equilibrium rest positions, r, of the mobile capacitor plates due to the absence of all control voltages.

In the first stage process, the method 60 includes selecting a single comb drive for calibration, i.e., the j-th comb drive (step 64). During the calibration of the selected comb drive, the no control voltages are applied to the other comb drives.

In the first stage process, the method 60 includes then, applying a sequence of control voltages to the selected j-th comb drive and measuring the equilibrium position of each mobile capacitor plate of the N comb drives for each control voltage that is applied to the selected j-th comb drive (step 66).

In the first stage process, the method 60 includes evaluating a portion of the capacitance slope function, $f_j(\Theta_j)$, for the selected j-th comb drive (step 68). In particular, the capacitance slope function is determined at the sequence of equilibrium configurations of step 66. Since the control voltage of the selected j-th comb drive is the only nonzero control voltage at the equilibrium configurations of step 66, equilibrium equation (8) also simplifies for the measured equilibrium positions, $\overline{\Theta}_j$, of the mobile capacitor plate of selected j-th comb drive. Since the diagonal elements of $K^{-1}$ are also equal to one, the capacitance slope function for the selected j-th comb drive may be evaluated from:

$$f_j(\overline{\Theta}_j)=(\overline{\Theta}_j-r_j)/W_j. \qquad (22)$$

Between the equilibrium positions of the sequence, $\overline{\Theta}_j$, the capacitance slope function may be estimated by interpolation and/or by fitting the determined values to a multi-parameter curve for capacitance slope functions.

In electro-mechanical actuators, the individual comb drives typically pull against each other so that the individual comb drives can move to strongly engaged or maximally engaged positions when the other comb drives of the actuators have vanishing applied control voltages. For that reason, at step 68, the determination of the capacitance slope function of the selected j-th comb drive may also determine its limiting value when it is strongly engaged, i.e., the value of $(\sigma_2)_j$ in equation (20b).

In some embodiments, the sequence of applied control voltages of step 68 may produce equilibrium positions that are in more than a single isolated stability region of the selected j-th comb drive. Indeed, the step 68 may include performing steps 34, 36, 38, 40, 42, and/or 44 of the method 30 to determine the equilibrium positions in an upper stability region and a lower stability region for the selected j-th comb drive and may include also making estimates of the boundaries of said stability regions.

In the first stage process, the method 60 also includes determining those elements of the inverse of the spring constant matrix that relate to the selected j-th comb drive, i.e., $K^{-1}_{ij}$ for i≠j (step 70). Again, equilibrium equation (8) simplifies, because only the j-th component of $\overline{W}$ is nonzero at the equilibrium configurations of step 66. For that reason, the matrix elements $K^{-1}_{ij}$ may be evaluated, e.g., from the simple equations:

$$K^{-1}_{ij} = \frac{(\overline{\Theta}_i - r_i)}{(\overline{\Theta}_i - r_i)} \text{ for } i \neq j. \qquad (23)$$

These elements of the inverse of the spring constant matrix, K, are obtained from the measured positions of $\overline{\Theta}_p$ with $r_p$ for p=1, . . . , for all N comb drives at the equilibrium configurations of step 66. Indeed, the determinations of the matrix elements $K^{-1}_{ij}$ may be further improved by performing a linear regression over the values that are obtained from equation (23) when different values of the control voltage are applied to the selected j-th comb drive.

In the first stage process, the method 60 may include making an estimate of the mechanical stability threshold, $\overline{r}_j$, of the selected j-th comb drive (step 72). Various methods are available to evaluate estimates of the mechanical stability thresholds. For example, Θ-intercepts may be evaluated for those tangent lines calculable from that part of the capacitance slope function of the selected j-th comb drive evaluated at step 68. Then, the mechanical stability threshold, $\overline{r}_j$, may be estimated to be the right boundary of the obtained values of the Θ-intercepts.

In the first stage process, the method 60 includes determining whether other comb drives remain to be selected at step 64 (step 74). If other comb drives remain, the method 60 includes looping back to step 64 to select one of the remaining comb drives. The looping continues until each of the N comb drives of the electro-mechanical actuator has been selected and processed as described above.

In the first stage process, the method 60 typically obtains each element of the inverse of the spring constant matrix, i.e., $K^{-1}$, because each comb drive is selected and processed as described above. For that reason, the method 60 also includes evaluating the spring constant matrix, K, by performing a matrix inversion on the determined matrix $K^{-1}$, e.g., by a conventional inversion procedure (step 76).

The second stage process of the method 60 uses a property of some electro-mechanical actuators with multiple comb drives. In some actuators, the individual comb drives of "pull against" each other, e.g., the spring constant matrix, K, has an appropriate form. In such cases, the effective equilibrium rest position of a first comb drive may be varied through the action of one or more of the other comb drives of the electro-mechanical actuator, e.g., to produce an effective equilibrium rest position of the first comb drive. Then, the mobile capacitor plate of the first comb drive may, e.g., be brought to its least engaged equilibrium position when one or more other comb drives of the electro-mechanical actuator are pulling against it. In such embodiments, such pulling against actions may effectively sweep equilibrium rest positions of the individual comb drives during the second stage process of the calibration method 60. That is, the second stage process may do one or more sweeps that vary the effective equilibrium rest position of the mobile capacitor plate for one or more of the comb drives. In such cases, the effective equilibrium rest position can determine stability properties of the operating positions of such mobile capacitor plates when the plates are pulled against by the other comb drives of the electro-mechanical actuator.

To illustrate the pulling against property it is noted that the electro-mechanical actuators 10', 10", 10''' of FIGS. 7, 8A, and 8B may be configured so that their comb drives pull against each other for appropriate spring constant matrices, K. With respect to the electro-mechanical actuator 10' of FIGS. 7, the comb drive 12A and the comb drive 12B can, e.g., pull against each other. For example, the effective equilibrium rest position of the comb drive 12A may be varied through the control voltage applied to the other comb drive 12B. Similarly, in the electro-mechanical actuator 10" of FIG. 8, each pair of comb drives 12A-12C may be able to pull against the remaining comb drive 12A-12C of the electro-mechanical actuator 10". For that reason, an effective equilibrium rest position of any comb drive 12A-12C can be effectively tunable through the control voltages applied to the remaining pair of comb drives 12A-12C. For example, the comb drives 12A, 12B pull against the comb drive 12C.

Indeed, the first stage process of the method 60 may be insufficient to obtain the full desired operating range of each capacitance slope function simply because of the use of such pulling against configurations during operation of the electro-mechanical actuator. At each repetition of step 68, the determination of the capacitance slope function of the selected comb drive is limited to those equilibrium positions of its mobile capacitor plate that are to the right of its actual equilibrium rest position, i.e., the position when all control voltages vanish. That is, each measured equilibrium position is more engaged than the actual equilibrium rest position for the same mobile capacitor plate. In contrast, when one or more other comb drives pull against the mobile capacitor plate, it may be moved to an equilibrium position that is more disengaged than at its actual equilibrium rest position. For that reason, the capacitance slope functions may be needed at equilibrium positions that are more disengaged than the actual equilibrium rest positions of step 62.

In the second stage process, the method 60 includes choosing a q-th comb drive and measuring its capacitance slope function at a new sequence of equilibrium positions (step 78). The new equilibrium positions are produced by pulling against the mobile capacitor plate of chosen q-th comb drive with one or more of the other comb drives of the electro-mechanical actuator. For each new equilibrium position, the pulling against results from applying a control voltage to each of the one or more other comb drives. If each comb drive except the chosen q-th comb drive is strongly engaged during step 78, the values of the capacitance slope function of the chosen q-th comb drive may be obtained by solving reduced equilibrium equation (21). Based on the properties measured during the first stage process, equation (21) may be solved for the capacitance slope function based on measurements of the new equilibrium positions of the mobile capacitor plate of the chosen q-th comb drive and the measured control voltages applied to the various comb drives.

In the second stage process, the method 60 may also include making a new estimate of the mechanical stability threshold, $\bar{r}_q$, for the chosen q-th comb drive (step 80). The new estimate is made in a manner similar to that used to obtain the estimate of step 72. Nevertheless, the new estimate is based on a bigger part of the capacitance slope function. In particular, the bigger part including values of the capacitance slope function at the equilibrium positions of the new sequence from step 78. The estimation process involves finding the right boundary of the region for the Θ-intercepts of tangent lines to the part of the capacitance slope function of positive slope. The new estimate may be an improvement on the old estimate if the actual equilibrium rest position of the mobile capacitor plate for the chosen q-th comb drive was not sufficiently disengaged when step 68 was performed for the same comb drive.

In the second stage process, the method 60 includes determining whether another comb drive remains to the be chosen at step 78 (step 82). If another comb drive remains, the method 60 includes looping back to repeat step 78. Otherwise, the method stops the second stage process.

In an alternate embodiment, the capacitance of a selected comb drive may be measured at disengaged positions directly by using use the in opposition or "pulling against" action of the comb drives of the electro-mechanical actuator. In particular, the mobile capacitor plate of the selected comb drive is pulled toward more disengaged positions by one or more other comb drives of the electro-mechanical actuator. As long as the pulling one or more comb drives are in strongly engaged regions, it would be straightforward to carry out such a process so that the mobile capacitor plate of the selected comb drive moves to more disengaged positions than the plate's actual equilibrium rest position, i.e., for an appropriate spring constant matrix, K. At each new equilibrium position, the capacitance slope function of the selected comb drive could be measured directly. For example, the selected comb drive could be connected to an LRC circuit whose resonant frequency would then, provide a direct measure of the capacitance of the selected comb drive. The same process could be repeated for the other comb drives of the electro-mechanical actuator. Then, the capacitance slope functions could be used in such embodiments to obtain the mechanical stability thresholds of the various comb drives as already described.

Figure 11:
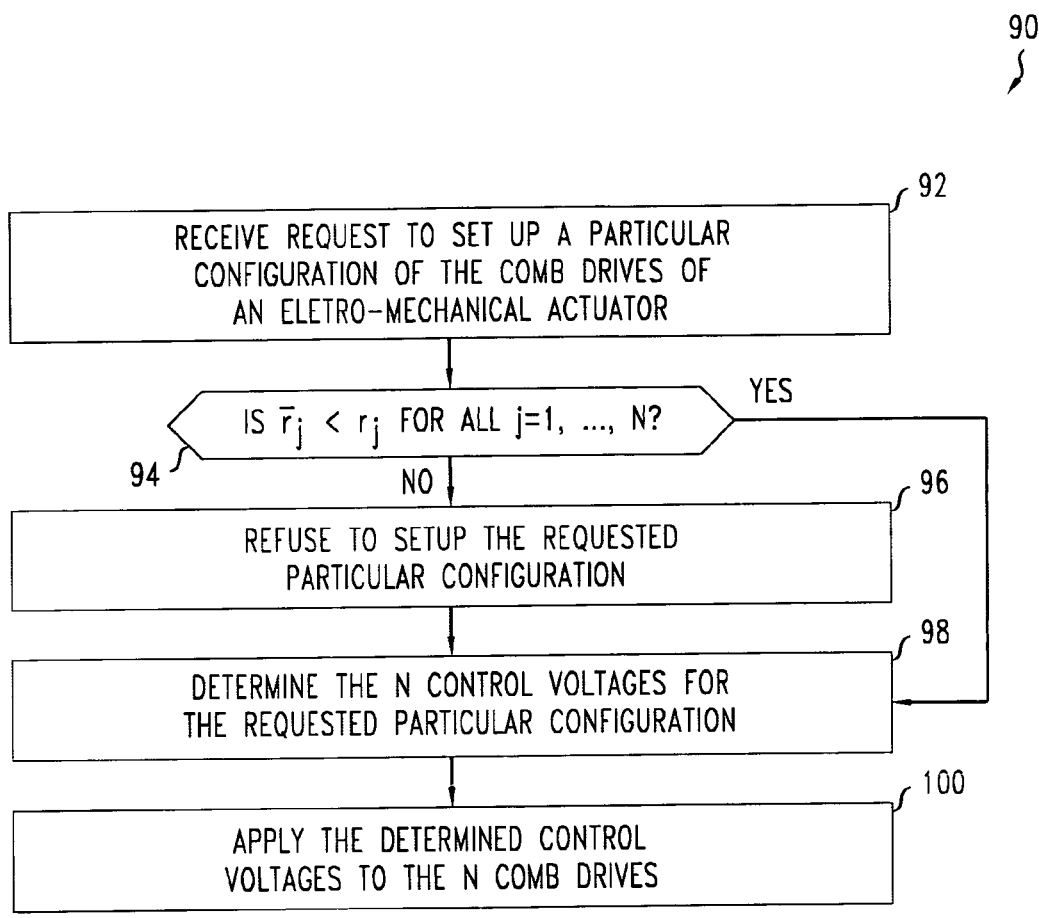
FIG. 11 is a flow chart illustrating a method of operating an electro-mechanical actuator with more than one comb drive, e.g., a MEMS actuator.

FIG. 11 illustrates a method 90 for operating an electro-mechanical actuator that has been calibrated, e.g., according to the method 60 of FIGS. 10A-10B.

The method 90 includes receiving a request for a particular configuration of the N comb drives of the electro-mechanical actuator (step 92). In particular, the requested configuration would include the desired positions of each of the N mobile capacitor plates of the electro-mechanical actuator, i.e., the vector Θ would, e.g., be received. The method 90 includes determining whether a condition is true or false for the particular requested configuration (step 94). The condition is that each comb drive is configured such that its associated mobile capacitor plate has an effective equilibrium rest position that causes the comb drive to be more engaged than it would be if the mobile capacitor plate were instead at its mechanical stability threshold. That is, the condition is that $\bar{r}_j < r_{eff,j}$ for all $j=1, \ldots, N$. The determination of whether the condition is true or false involves comparing the effective equilibrium rest positions, $\{r_{eff,j}\}$, for the individual mobile capacitor plates, i.e., in the requested particular configuration, to their known mechanical threshold positions. In response to determining that the condition is false for the particular requested configuration, the method 90 includes sending a message to indicate that the requested configuration has been refused (step 96). In response to determining that the condition is true for the particular requested configuration, the method 90 includes determining the values of the control voltages needed to position the mobile capacitor plates in the requested equilibrium configuration (step 98). The control voltages are determined, e.g., by solving the equilibrium equation (13) for $\overline{W}$. If the condition is true for the particular requested configuration, the method 90 also includes applying the determined control voltages to the N comb drives to reconfigure the electro-mechanical actuator in the requested equilibrium configuration (step 100).

In alternate embodiments of the method 90 of FIG. 11, step 94 determines whether an alternate condition is true or false for the requested particular configuration. The alternate condition is that (N−1) of N the comb drives are strongly engaged in the particular requested configuration. In such embodiments, step 100 of applying the determined control voltages may include first applying control voltages that ensure that the mobile capacitor plates are in desired stability regions and then, gradually changing one or more of the applied control voltages to cause the mobile capacitor plates to take the requested equilibrium positions without moving into any instability regions.

From the above disclosure, the figures, and the claims, other embodiments will be apparent to those of skill in the art.

What we claim is:

1. An apparatus, comprising:
   an electro-mechanical actuator comprising:
      a comb drive having a first capacitor plate and a second capacitor plate, the capacitor plates having teeth capable of inter-digitating, the comb drive having a mechanical stability threshold; and
      a deformable connector configured to apply a mechanical restoring force to the first capacitor plate; and
   wherein the deformable connector is configured to restore the first capacitor plate to be at an equilibrium rest position in response to no control voltage being applied across the comb drive, the comb drive being more engaged when the first capacitor plate is at the equilibrium rest position than when the first capacitor plate is at the mechanical stability threshold of the comb drive, the first and second capacitor plates being disengaged such that the teeth thereof are separated by a gap along a movement direction of the first capacitor plate when the first capacitor plate is at the equilibrium rest position, the first capacitor plate being at the mechanical stability threshold when positioned at the one of the intercepts of the tangent lines to the positive slope part of the capacitance slope function for which the comb drive is most engaged.

2. The apparatus of claim 1, wherein the first capacitor plate has a unique equilibrium position for each control voltage applied across the comb drive.

3. The apparatus of claim 1, wherein the electro-mechanical actuator further comprises:

a second comb drive having a third capacitor plate and a fourth capacitor plate, the third and fourth capacitor plates having teeth capable of inter-digitating, the second comb drive having a mechanical stability threshold, a movable one of the capacitor plates of the second comb drive being at the mechanical stability threshold thereof when positioned at the one of the intercepts of the tangent lines to the positive slope part of the capacitance slope function of the second comb drive for which the second comb drive is most engaged;

a second deformable connector configured to apply a restoring force to the third capacitor plate; and a voltage source connected to apply voltages across the comb drives such that both comb drives can become disengaged and such that each comb drive is more engaged when a movable one of its plates is at its equilibrium rest position than when the movable one of its plates is at its mechanical stability threshold.

4. The apparatus of claim 3, wherein the voltage source is configured to apply one nonzero voltage across the second comb drive to cause the first capacitor plate to move to an equilibrium position and be disengaged from the second capacitor plate.

5. The apparatus of claim 4, wherein the voltage source is configured to apply voltages to the comb drives such that the movable one of the plates of each comb drive is more engaged at its effective equilibrium rest position than at its mechanical stability threshold.

6. The apparatus of claim 3, wherein the voltage source is configured to apply control voltages that cause the first capacitor plate to be engaged in the comb drive containing the first capacitor plate when the third capacitor plate is disengaged in the comb drive containing the third capacitor plate.

* * * * *